(12) United States Patent  
Yamaoka et al.

(10) Patent No.: US 8,744,207 B2  
(45) Date of Patent: Jun. 3, 2014

(54) IMAGE PROCESSING DEVICE, IMAGE PROCESSING METHOD, IMAGE PROCESSING PROGRAM AND RECORDING MEDIUM

(75) Inventors: Kensuke Yamaoka, Tokyo (JP); Masayuki Ikebe, Hokkaido (JP); Sousuke Shimoyama, Hokkaido (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 17 days.

(21) Appl. No.: 13/534,782

(22) Filed: Jun. 27, 2012

(65) Prior Publication Data  
US 2013/0177257 A1    Jul. 11, 2013

(30) Foreign Application Priority Data

Jun. 28, 2011 (JP) ................ P2011-142492  
May 17, 2012 (JP) ................ P2012-113179

(51) Int. Cl.  
*G06K 9/40* (2006.01)

(52) U.S. Cl.  
USPC .......................................... 382/274

(58) Field of Classification Search  
USPC .......... 382/162, 167, 274; 358/1.9, 461, 521; 348/222.1  
See application file for complete search history.

(56) References Cited

U.S. PATENT DOCUMENTS 5,123,060 A     6/1992   Cho et al.  
2011/0268358 A1  11/2011  Ikebe et al.

FOREIGN PATENT DOCUMENTS

| EP | 1 898 624 | 3/2008 |
| JP | 4214457 | 11/2008 |
| JP | 2011-097465 | 5/2011 |

*Primary Examiner* — Duy M Dang  
(74) *Attorney, Agent, or Firm* — Young & Thompson

(57) ABSTRACT

Converting lightness of each pixel even for images having continuous lightness includes: setting a local area around a pixel for which lightness is converted, in the original image; setting an upper limit conversion function which continuously monotonically increases with respect to the lightness, and determines an output upper limit of lightness conversion; setting a lower limit conversion function which continuously monotonically increases with respect to the lightness, and determines an output lower limit of lightness conversion; calculating upper and lower limit values (upper and lower limit conversion function of lightness of the pixel to be converted); calculating a ratio for setting a value between the upper limit value and the lower limit value according to lightness of each pixel in the local area; and calculating converted lightness of a pixel for which the lightness is converted based on the upper limit value, the lower limit value and the ratio.

9 Claims, 20 Drawing Sheets

IMAGE PROCESSING DEVICE, IMAGE PROCESSING METHOD, IMAGE PROCESSING PROGRAM AND RECORDING MEDIUM

TECHNICAL FIELD

The present invention relates to an image processing device, an image processing method, an image processing program, and a recording medium which performs image correction of a gradation of an image.

BACKGROUND ART

A technique of improving bias of lightness such as brightness or luminance in a technique of correcting images captured by commercial digital still cameras and wide dynamic range camera (having expressiveness equal to or more than 8 bits of R, G and B colors) is gaining attention. A processing target image is mainly corrected using a single brightness characteristic to improve bias of, for example, brightness, and, for a function of correcting the brightness characteristic includes, for example, a gamma correction function, a logarithmic function or a function defined using statistical processing such as histogram averaging is used.

Further, following a spread of broadband internet connection such as optical fibers and an increase in the resolution of movies and the like such as high-definition television broadcast, devices such as digital still cameras and digital video cameras provide higher image quality such as several mega pixels to giga pixels, and are required to provide a higher speed of image processing and higher accuracy.

Hence, for example, Patent Document 1 discloses an image processing device which obtains a gradation compression image to adequately emphasize a contrast of an image at a higher speed. Further, as to higher accuracy, Patent Document 2 discloses an image processing device which sets a local area, calculates a local histogram related to lightness in the local area, accumulates a local histogram and calculates a local cumulative histogram, determines each of monotonically increasing functions corresponding to a cumulative numerical value in each class of the local cumulative histogram, determines each of weighting functions for each monotonically increasing function, generates a conversion function of lightness of a pixel from each monotonically increasing function weighted by the weighting function and converts lightness of the pixel.

PRIOR ART DOCUMENT

Patent Document

Patent Document 1: Japanese Patent No. 4214457
Patent Document 2: Japanese Patent Application Laid-Open No. 2011-97465

SUMMARY OF THE INVENTION

Problems to be Solved by the Invention

However, with the technique in Patent Document 1, when an entire image is divided into blocks and processed per block to increase an image processing speed, block noise occurs. Further, with conventional image correction, when, for example, a black shadow in an image is corrected, an area of an outline portion or an area in which certain brightness concentrates in the image becomes unnatural, and correction is not sufficient. Furthermore, with Patent Document 2, in case of images in which lightness continuously changes such as a fine sky, an artificial material of a car body and the like or a surface of a lake without waves, it is difficult to sufficiently accurately convert lightness.

The present invention is made to solve the above problem, and it is therefore an object of the present invention to provide an image processing device, an image processing method, and an image processing program which can accurately convert lightness of each pixel even for an image having continuous lightness.

Means for Solving the Problems

To solve the above problem, an invention according to a first aspect of the present invention has: an original image inputting means that receives an input of an original image for which image processing is performed; a local area setting means that sets a local area around a pixel for which lightness is converted in the original image; an upper limit conversion function setting means that sets an upper limit conversion function which continuously and monotonically increases with respect to the lightness and determines an output upper limit of lightness conversion; a lower limit conversion function setting means that sets a lower limit conversion function which continuously and monotonically increases with respect to the lightness and determines an output lower limit of lightness conversion; an upper limit/lower limit calculating means that calculates an upper limit value which is a value of the upper limit conversion function of lightness of the pixel to be converted and a lower limit value which is a value of the lower limit conversion function; a ratio calculating means that calculates a ratio for setting a value between the upper limit value and the lower limit value according to lightness of each pixel in the local area; and a lightness calculating means that calculates converted lightness of a pixel for which the lightness is converted, based on the upper limit value, the lower limit value and the ratio.

Further, in the image processing device according to the first aspect of the present invention, an invention according to a second aspect of the present invention further has: a lightness area function setting means that sets a lightness area function for defining a lightness area according to a weight with respect to the lightness; and a lightness conversion function setting means that sets a lightness conversion function by accumulating the lightness area function for lightness, and the ratio calculating means calculates a ratio by applying the lightness conversion function to lightness of each pixel in the local area.

Further, with an invention according to a third aspect of the present invention, the image processing device according to the second aspect of the present invention, the lightness area function setting means sets each lightness area function per lightness area, the lightness conversion function setting means sets each lightness conversion function for each lightness area function, the upper limit conversion function setting means sets an upper limit conversion function according to each lightness area, the lower limit conversion function setting means sets a lower limit conversion function according to each lightness area, the upper limit/lower limit calculating means calculates each upper limit value according to the upper limit conversion function and lower limit value according to the lower limit conversion function corresponding to each lightness area, the ratio calculating means calculates each ratio for the upper limit value and the lower limit value by applying each lightness conversion function, and the lightness calculating means calculates the converted lightness based on each of the upper limit value and the lower limit value and each of the ratios.

Further, with an invention according to a fourth aspect of the present invention, in the image processing device according to one of the first aspect to the third aspect of the present invention, the lightness area function is a continuous function.

Further, with an invention according to a fifth aspect of the present invention, in the image processing device according to one of the first aspect to the fourth aspect of the present invention, the upper limit conversion function and the lower limit conversion function are functions for making correction to match visual characteristics with respect to lightness.

Further, with an invention according to a sixth aspect of the present invention, in the image processing device according to the fifth aspect of the present invention, the upper limit conversion function and the lower limit conversion function are gamma correction functions.

Further, in the image processing device according to one of the first aspect to the sixth aspect of the present invention, an invention according to a seventh aspect of the present invention further has: a local histogram calculating means that calculates a local histogram related to lightness in the local area; and a lightness cumulative histogram calculating means that calculates a lightness cumulative histogram obtained by accumulating lightness of each pixel in the local area, and the ratio calculating means calculates the ratio based on the local histogram and the lightness cumulative histogram.

Further, an invention according to an eighth aspect of the present invention includes in an image processing method of processing an image in an image processing device: an original image inputting step of receiving an input of an original image for which image processing is performed; a local area setting step of setting a local area around a pixel for which lightness is converted, in the original image; an upper limit conversion function setting step of setting an upper limit conversion function which continuously and monotonically increases with respect to the lightness and determines an output upper limit of lightness conversion; a lower limit conversion function setting step of setting a lower limit conversion function which continuously and monotonically increases with respect to the lightness and determines an output lower limit of lightness conversion; an upper limit/lower limit calculating step of calculating an upper limit value which is a value of the upper limit conversion function of lightness of the pixel to be converted and a lower limit value which is a value of the lower limit conversion function; a ratio calculating step of calculating a ratio for setting a value between the upper limit value and the lower limit value according to lightness of each pixel in the local area; and a lightness calculating step of calculating converted lightness of a pixel for which the lightness is converted, based on the upper limit value, the lower limit value and the ratio.

Further, an invention according to a ninth aspect of the present invention causes a computer to function as: an original image inputting means that receives an input of an original image for which image processing is performed; a local area setting means that sets a local area around a pixel for which lightness is converted, in the original image; an upper limit conversion function setting means that sets an upper limit conversion function which continuously and monotonically increases with respect to the lightness and determines an output upper limit of lightness conversion; a lower limit conversion function setting means that sets a lower limit conversion function which continuously and monotonically increases with respect to the lightness and determines an output lower limit of lightness conversion; an upper limit/lower limit calculating means that calculates an upper limit value which is a value of the upper limit conversion function of lightness of the pixel to be converted and a lower limit value which is a value of the lower limit conversion function; a ratio calculating means that calculates a ratio for setting a value between the upper limit value and the lower limit value according to lightness of each pixel in the local area; and a lightness calculating means that calculates converted lightness of a pixel for which the lightness is converted, based on the upper limit value, the lower limit value and the ratio.

Further, an invention according to a tenth aspect of the present invention has a computer-readable image processing program recorded thereon which causes a computer to function as: an original image inputting means that receives an input of an original image for which image processing is performed; a local area setting means that sets a local area around a pixel for which lightness is converted, in the original image; an upper limit conversion function setting means that sets an upper limit conversion function which continuously and monotonically increases with respect to the lightness and determines an output upper limit of lightness conversion; a lower limit conversion function setting means that sets a lower limit conversion function which continuously and monotonically increases with respect to the lightness and determines an output lower limit of lightness conversion; an upper limit/lower limit calculating means that calculates an upper limit value which is a value of the upper limit conversion function of lightness of the pixel to be converted and a lower limit value which is a value of the lower limit conversion function; a ratio calculating means that calculates a ratio for setting a value between the upper limit value and the lower limit value according to lightness of each pixel in the local area; and a lightness calculating means that calculates converted lightness of a pixel for which the lightness is converted, based on the upper limit value, the lower limit value and the ratio.

Effect of the Invention

The present invention includes: setting a local area around a pixel for which lightness is converted, in the original image; setting an upper limit conversion function which continuously and monotonically increases with respect to the lightness and determines an output upper limit of lightness conversion; setting a lower limit conversion function which continuously and monotonically increases with respect to the lightness and determines an output lower limit of lightness conversion; calculating an upper limit value which is a value of the upper limit conversion function of lightness of the pixel to be converted and a lower limit value which is a value of the lower limit conversion function; calculating a ratio for setting a value between the upper limit value and the lower limit value according to lightness of each pixel in the local area; and calculating converted lightness of a pixel for which lightness is converted, based on the upper limit value, the lower limit value and the ratio, so that it is possible to accurately convert lightness of each pixel even for an image having continuous brightness.

DETAILED DESCRIPTION OF THE PREFERRED EMBODIMENTS

Hereinafter, an embodiment for implementing the present invention will be described with reference to the drawings.

[1. Outline of Configuration and Function]

(1.1 Configuration and Function of Image Processing Device)

First, a schematic configuration and function of an image processing device according to a first embodiment of the present invention will be described using drawings.

Figure 1:
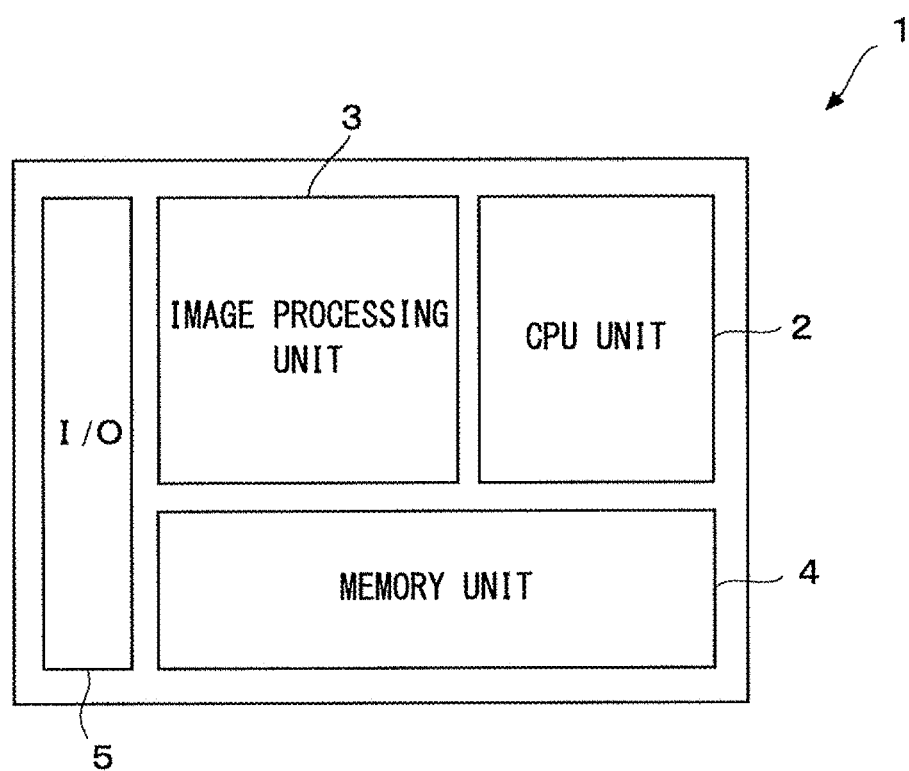
FIG. 1 illustrates a block diagram that illustrates a schematic configuration example of an image processing device according to a first embodiment of the present invention.

FIG. 1 illustrates a block diagram that illustrates a schematic configuration example of the image processing device according to the first embodiment of the present invention.

As illustrated in FIG. 1, an image processing device 1 has a CPU (Central Processing Unit) unit 2 which is image processing LSI (Large Scale Integration) and performs various types of computation, an image processing unit 3 which performs dedicated image processing, a memory unit 4 which stores, for example, image data, and an input/output unit (I/O) 5 which receives an input of image data to be processed and outputs a processing result. In the image processing device 1, these units are integrated on a single dye and connected through an internal bus (not illustrated).

The input/output unit 5 has a function of converting an arbitrary image signal (for example, RGB signal) into an image signal indicating brightness and a color such as Y, Cb or Cr.

The CPU unit 2 has, for example, a computing device and a register, and executes various programs, controls an input and an output of data through the input/output unit 5, gives a command of image processing to the image processing unit 3 and controls, for example, a main memory outside the image processing device 1.

The image processing unit 3 has, for example, a logic circuit, a line memory and a shift register. Further, the image processing unit 3 performs dedicated image processing of, for example, extracting from an original image a local area around a pixel for which lightness such as brightness or luminance is converted and converting lightness based on lightness of each pixel in the local area, according to a command from the CPU unit 2. Furthermore, the image processing unit 3 has a circuit for sequentially performing image processing at a high speed utilizing a Box-Filtering scheme.

The memory unit 4 is configured to include, for example, a DRAM (Dynamic Random Access Memory), and has a memory which stores images, that is, a frame memory function. Further, in the memory unit 4, a parameter table required for image processing is stored.

(1.2 Circuit Configuration of Image Processing Unit)

Next, a circuit configuration of the image processing unit 3 will be described using drawings.

Figure 2:
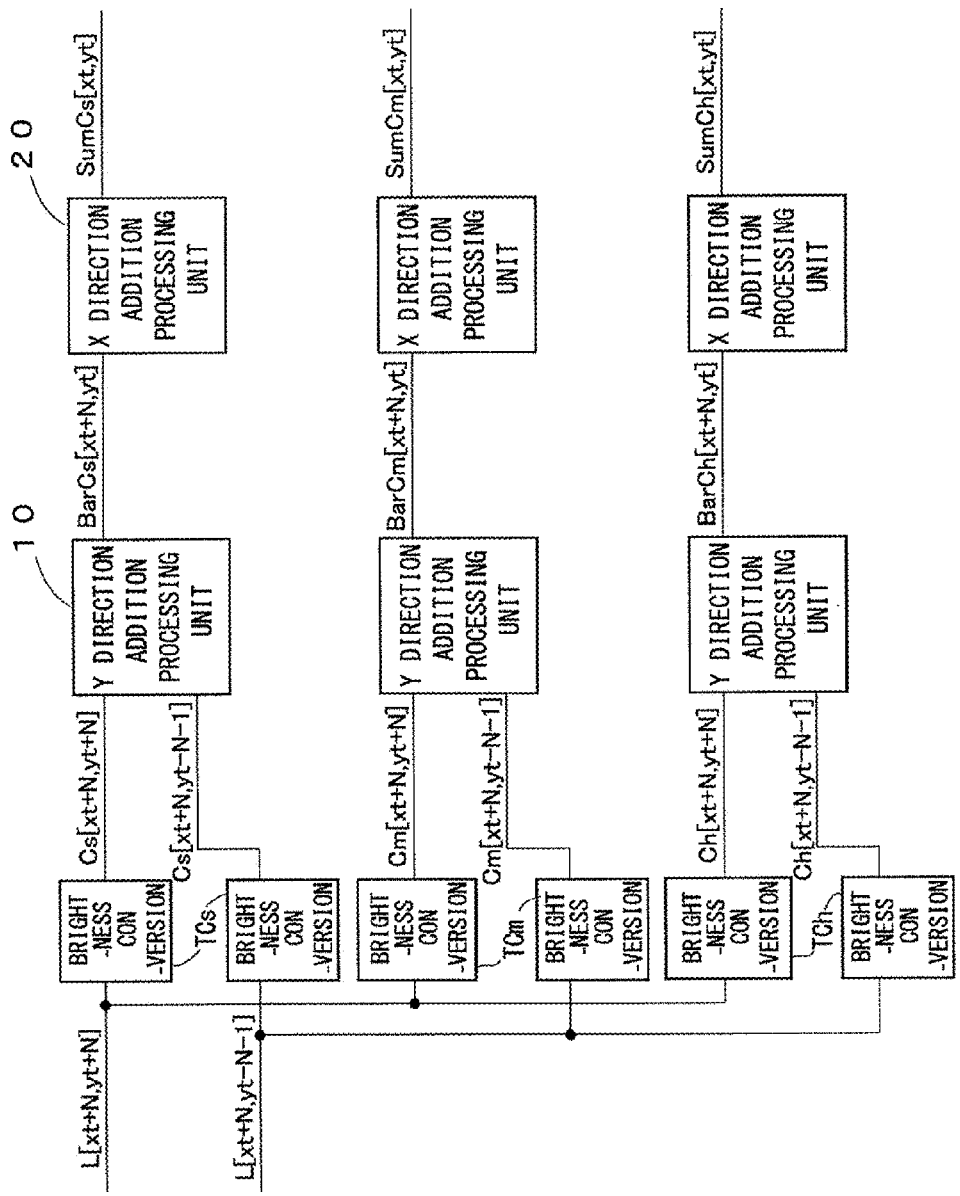
FIG. 2 illustrates a block diagram that illustrates a schematic configuration example of an image processing unit in FIG. 1.

FIG. 2 is a block diagram that illustrates a schematic configuration example of the image processing unit 3. Meanwhile, an X direction refers to a direction in which an original image which is an image processing target is scanned, and a Y direction refers to a direction in which, when the scan of the original image in the X direction comes to an end of the X direction, scan is moved one pixel sequentially in the Y direction.

As illustrated in FIG. 2, the image processing unit 3 has brightness value conversion table units TCs, TCm and TCh which realize brightness value conversion functions of converting a brightness value according to a brightness value of pixel data of an original image, Y direction addition processing units 10 which process pixel data from the brightness value conversion table units TCs, TCm and TCh, and X direction addition processing units 20 which process pixel data from the Y direction addition processing units 10. In addition, the Y direction addition processing units 10 and the X direction addition processing units 20 realize the Box-Filtering scheme, and provide a higher calculation speed.

The brightness value conversion table unit TCs has a low brightness area brightness value conversion table, the brightness value conversion table unit TCm has a middle brightness area brightness value conversion table, and the brightness value conversion table unit TCh has a high brightness area brightness value conversion table. The two brightness area brightness value conversion table units receive inputs of brightness values at pixel positions shifted in the Y direction. Output terminals of the brightness value conversion table units TCs, TCm and TCh are connected with the Y direction addition processing units 10, respectively. Input terminals of the Y direction addition processing unit 10 are connected with the output terminals of the two brightness value conversion table units. Each Y direction addition processing unit 10 is connected with each X direction addition processing unit 20.

Each of the brightness value conversion table units TCs, TCm and TCh receives an input of a brightness value L [xt+N, yt−N−1] spaced the number of taps 2N+1 apart in the Y direction from the brightness value L [xt+N, yt+N] of a given pixel in a local area of an original image, and each of the brightness value conversion table units TCs, TCm and TCh outputs a value corresponding to each brightness value conversion table.

Further, using the brightness value conversion table units TCs, TCm and TCh, the Y direction addition processing units 10 and the X direction addition processing units 20, the image processing unit 3 finds data SumCs, SumCm and SumCh which are the sums of brightness values converted by brightness value conversion functions Cs[L], Cm[L] and Ch[L] per brightness area Bs, Bm or Bh as statistical information of a local area (a square area of the number of taps 2N+1) around the brightness value L [xt, yt] of a given target pixel PIX [xt, yt] at a coordinate [xt, yt].

(1.3 Schematic Configuration and Function of Y Direction Addition Processing Unit 10)

Next, a schematic configuration and function of the Y direction addition processing unit 10 will be described using FIG. 3. In addition, data will be described using data Cs, and the same applies to data Cm and Ch and description thereof will be omitted.

Figure 3:
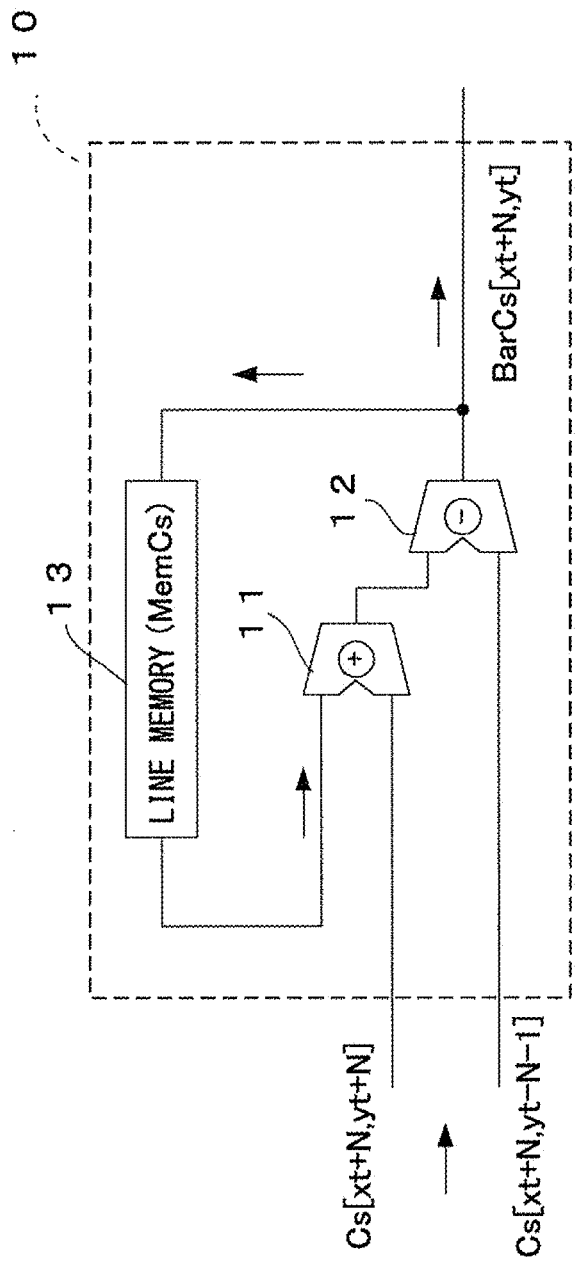
FIG. 3 illustrates a block diagram that illustrates a schematic configuration example of a Y direction addition processing unit illustrated in FIG. 2.

FIG. 3 illustrates a block diagram that illustrates a schematic configuration example of the Y direction addition processing unit 10.

As illustrated in FIG. 3, the Y direction addition processing unit 10 has an adder 11 which adds output data Cs [xt+N, yt+N] of the brightness value conversion table unit TCs from the input side and data BarCs fed back from the output side, a subtractor 12 which subtracts output data Cs [xt+N, yt−N−1] of the brightness value conversion table unit TCs from the input side, from the output data from the adder 11, and a line memory 13 which stores the data BarCs from the subtractor 12 in order of one line (corresponding to the number of pixels in the X direction of the original image). In addition, a coordinate of image data is an example.

The adder 11 is, for example, a multibit adder formed with a half adder or a full adder, and adds binary digits having an arbitrary number of digits.

The subtractor 12 is, for example, a multibit subtractor formed with, for example, a not circuit or a full adder, and subtracts the binary digits having an arbitrary number of digits.

The line memory 13 is a memory which stores, for example, pixel data having a length corresponding to a line of the original image in the X direction, and functions as a shift register which stores output data BarCs [xt+N, yt] from the subtractor 12 and outputs data delayed by one line to the adder 11. That is, the line memory 13 functions as an FIFO memory which discards BarCs [xt+N, yt−1] which is referred to every addition processing, and stores generated BarCs [xt+N, yt]. Meanwhile, the image processing device 1 scans one pixel after another in the X direction and outputs pixel data delayed by one line, and the line memory 13 outputs pixel data minus one pixel in the Y direction.

An input of the Y direction addition processing unit 10 is formed with one input terminal of the adder 11 and one input terminal of the subtractor 12. The output terminal of the adder 11 is connected to the input terminal of the subtractor 12 and the output terminal of the subtractor 12 forms an output terminal which sends an output to an outside of the Y direction addition processing unit 10, and this branch is connected to the input terminal of the line memory 13. Further, the output terminal of the line memory 13 is connected to the input terminal of the adder 11.

(1.4 Schematic Configuration and Function of X Direction Addition Processing Unit 20)

Next, a schematic configuration and function of the X direction addition processing unit 20 will be described using FIG. 4. In addition, data will be described using data BarCs, and the same applies to data BarCm and BarCh and description thereof will be omitted.

Figure 4:
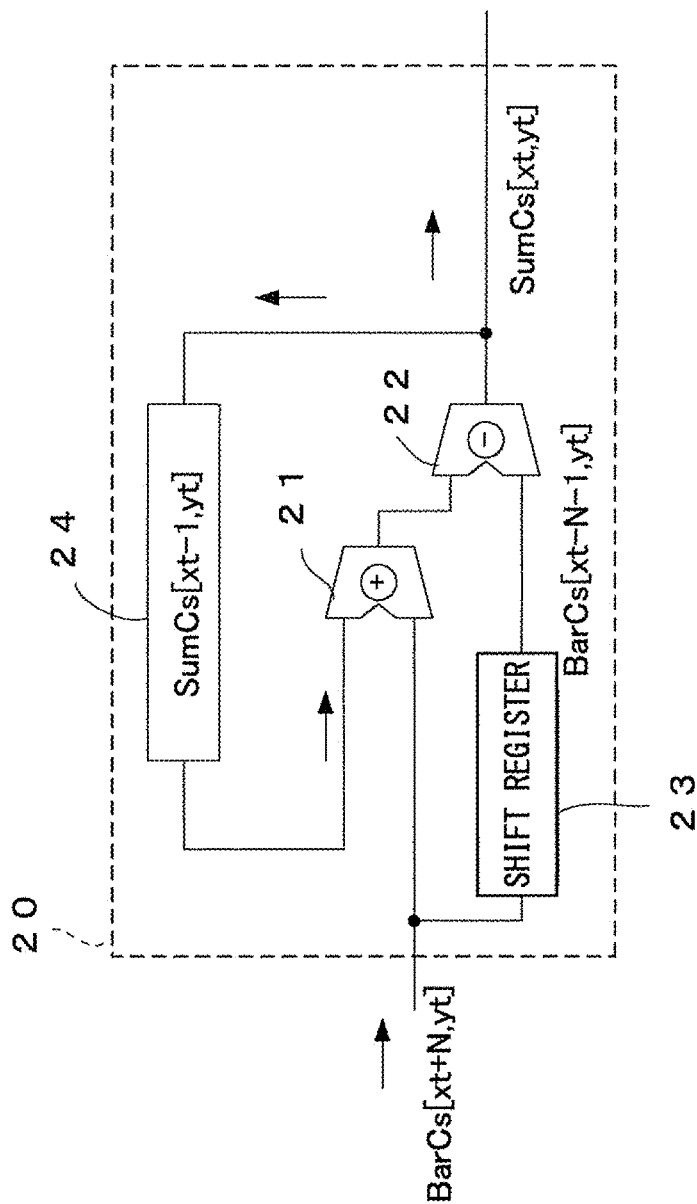
FIG. 4 illustrates a block diagram that illustrates a schematic configuration example of an X direction addition processing unit illustrated in FIG. 2.

FIG. 4 illustrates a block diagram that illustrates a schematic configuration example of the X direction addition processing unit 20.

As illustrated in FIG. 4, the X direction addition processing unit 20 has an adder 21 which adds input data BarCs [xt+N, yt] from the input side and data SumCs [xt, yt] fed back from the output side, a subtractor 22 which subtracts shift-registered data BarCs [xt−N−1, yt] which is inputted from the input side, from the output data from the adder 21 and outputs the data to the outside, a shift register 23 which shift-registers data BarCs [xt+N, yt] inputted from the input side and a memory 24 which stores one data of output data SumCs [xt, yt] of the subtractor 22 and outputs data SumCs [xt−1, yt] to the adder 21.

The adder 21 has the same configuration and function as the adder 11, and the subtractor 22 has the same configuration and function as the subtractor 12.

The shift register 23 stores data corresponding to the number of taps, and functions as a shifter register which stores the input data BarCs [xt+N, yt] from the input side and outputs the data BarCs [xt−N−1, yt] delayed by the number of taps, to the subtractor 22.

The memory 24 is a delay element which stores one data.

The input of the X direction addition processing unit 20 is connected to the input terminals of the adder 21 and the shifter register 23. The output terminals of the adder 21 and the shift register 23 are connected to the input terminals of the subtractor 22, the output terminal of the subtractor 22 forms an output terminal which sends an output to an outside of the X direction addition processing unit 20, and this branch is connected to the input terminal of the memory 24. Further, the output terminal of the memory 24 is connected to the input terminal of the adder 21.

[2. Operation of Image Processing Device According to First Embodiment]

(2.1 Operation Example of Image Processing Device 1)

Next, an operation example of the image processing device 1 will be described using FIGS. 5 to 11.

Figure 5:
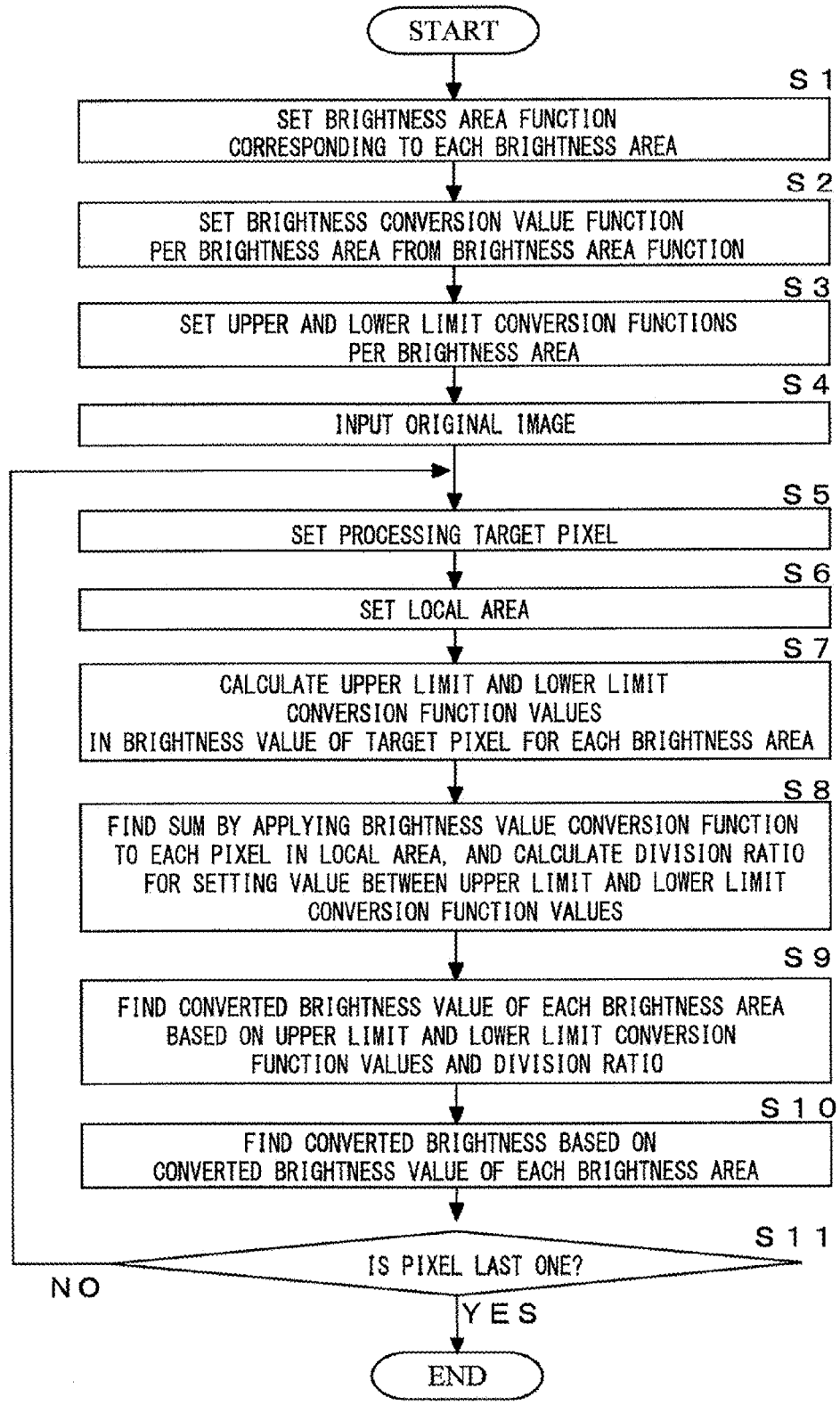
FIG. 5 illustrates a flowchart that illustrates an operation example of the image processing device in FIG. 1 according to the first embodiment.
Figure 6:
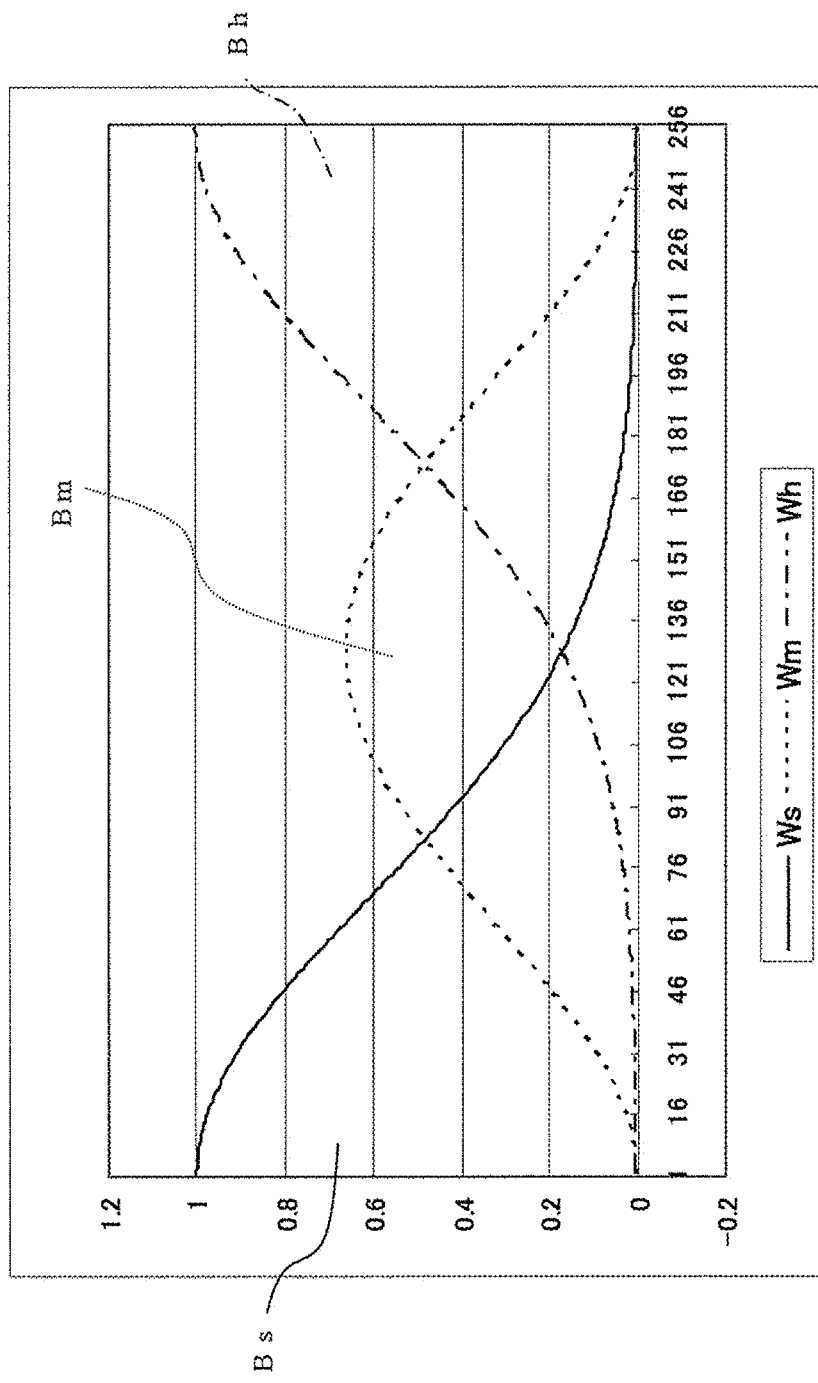
FIG. 6 illustrates a diagram that illustrates an example of a weighting function for dividing brightness into brightness areas.
Figure 7:
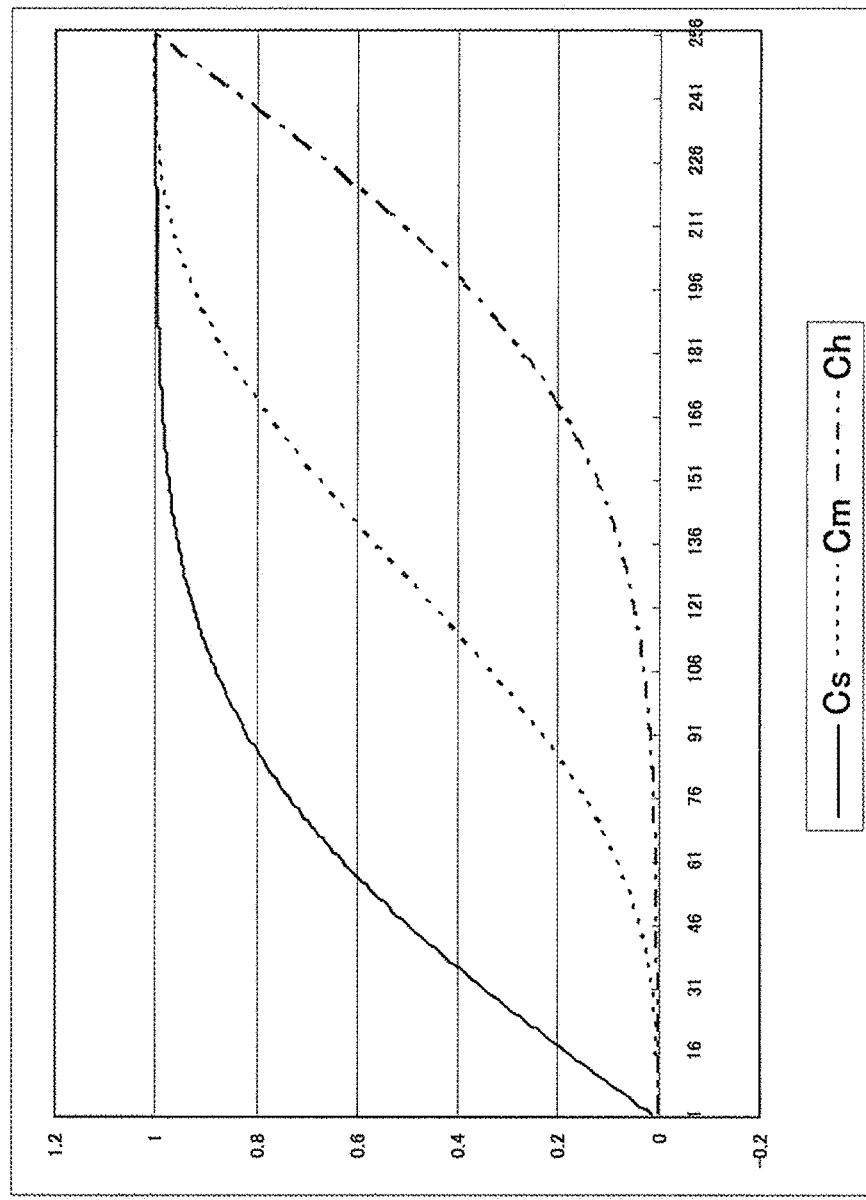
FIG. 7 illustrates a diagram that illustrates an example of a brightness value conversion function for the weighting function in FIG. 6.
Figure 8A:
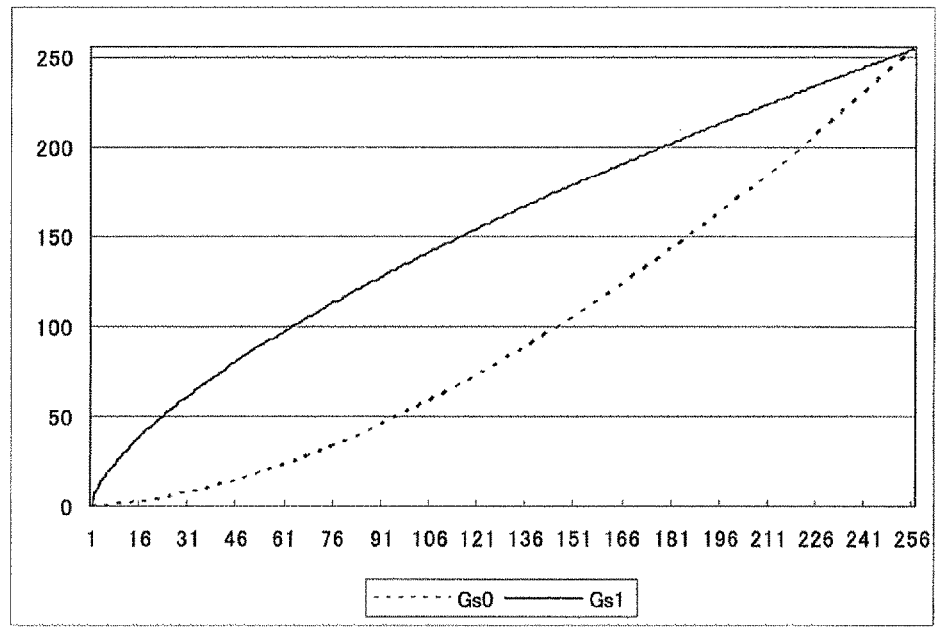
FIG. 8A illustrates a diagram that illustrates an example of an upper limit conversion function and a lower limit conversion function in a low brightness area.
Figure 8B:
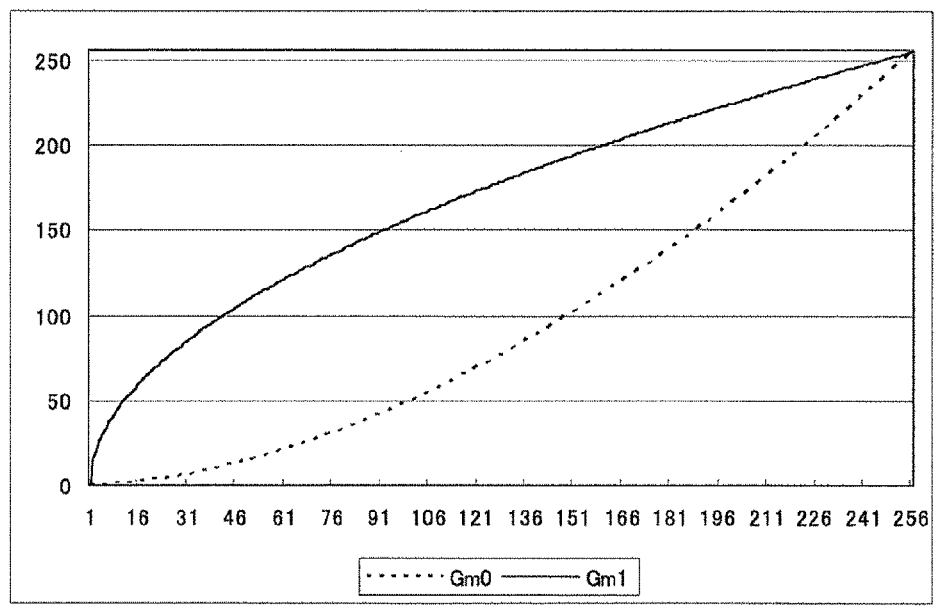
FIG. 8B illustrates a diagram that illustrates an example of an upper limit conversion function and a lower limit conversion function in a middle brightness area.
Figure 8C:
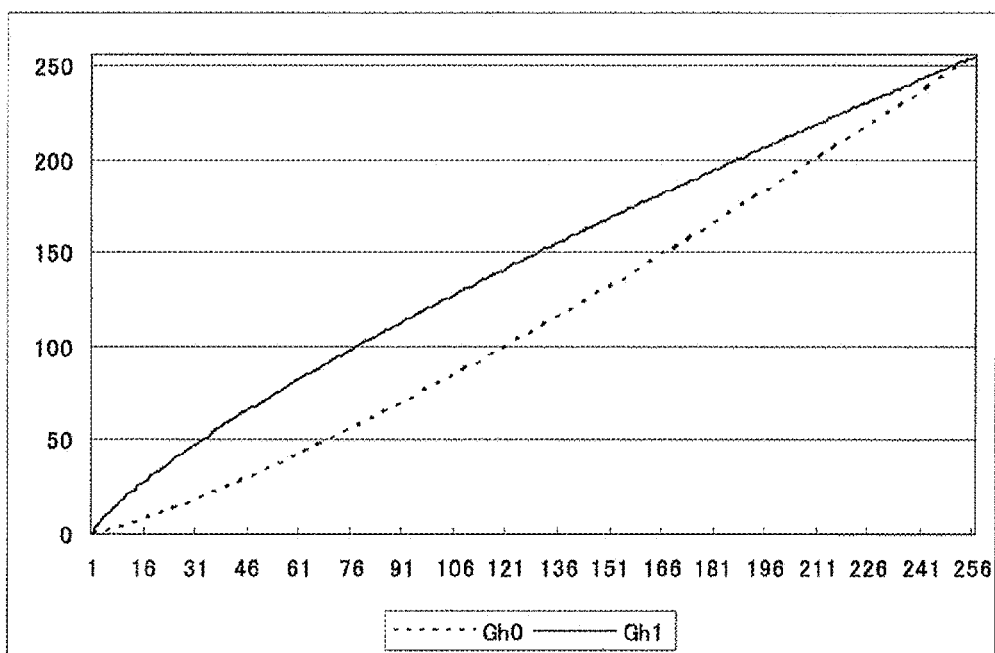
FIG. 8C illustrates a diagram that illustrates an example of an upper limit conversion function and a lower limit conversion function in a high brightness area.
Figure 9:
FIG. 9 illustrates a schematic diagram that illustrates an example of an original image for which the image processing device in FIG. 1 performs image processing.
Figure 10:
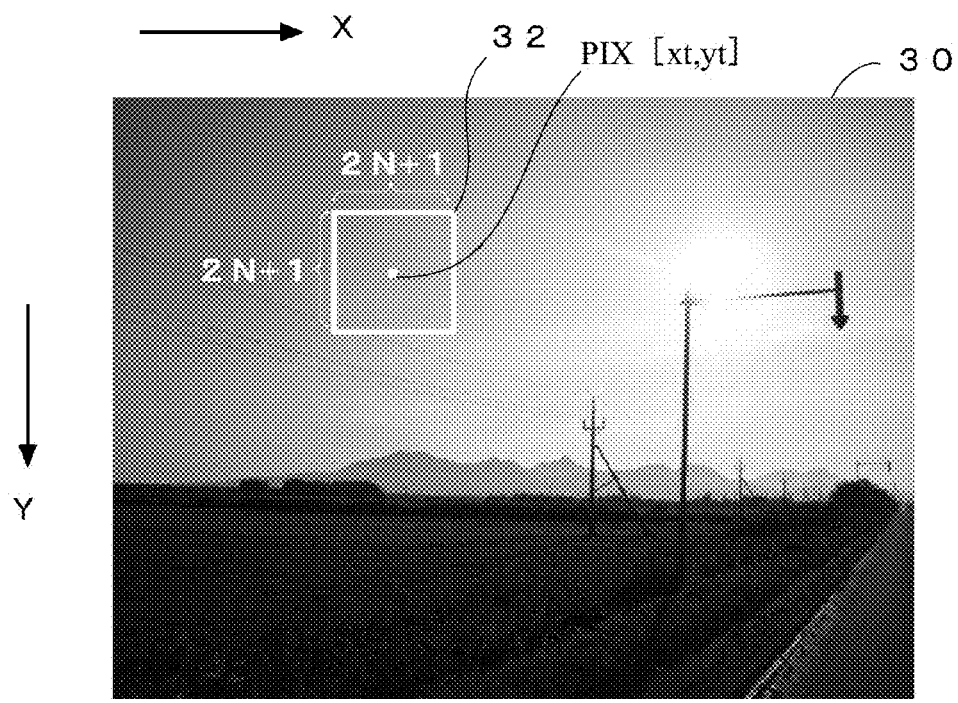
FIG. 10 illustrates a schematic diagram that illustrates an example of a local area around a given pixel for which brightness is converted in the original image in FIG. 9.
Figure 11A:
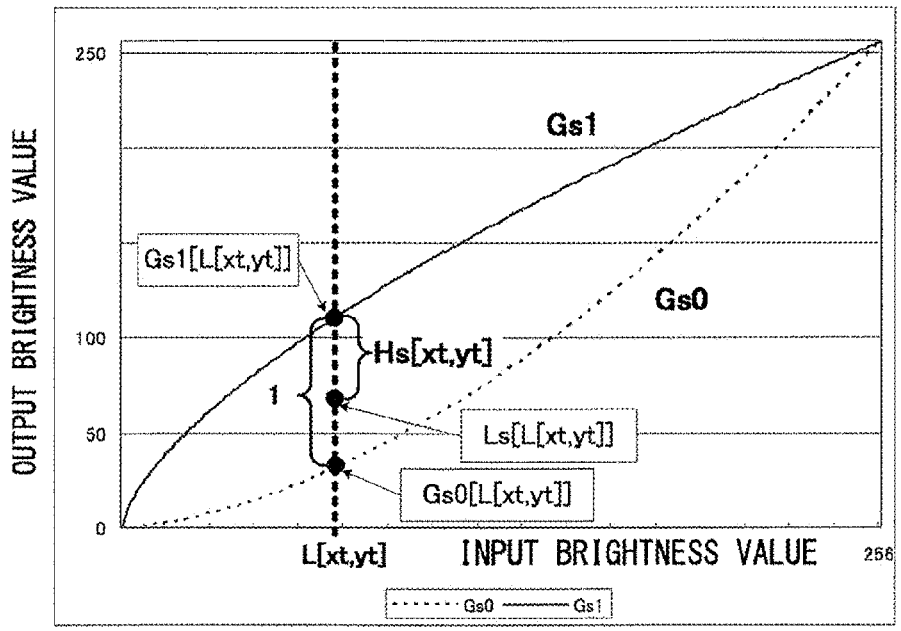
FIG. 11A illustrates a schematic diagram that illustrates an example of an upper limit value and a lower limit value with respect to a brightness value of a target pixel, and a converted brightness value in the low brightness area.
Figure 11B:
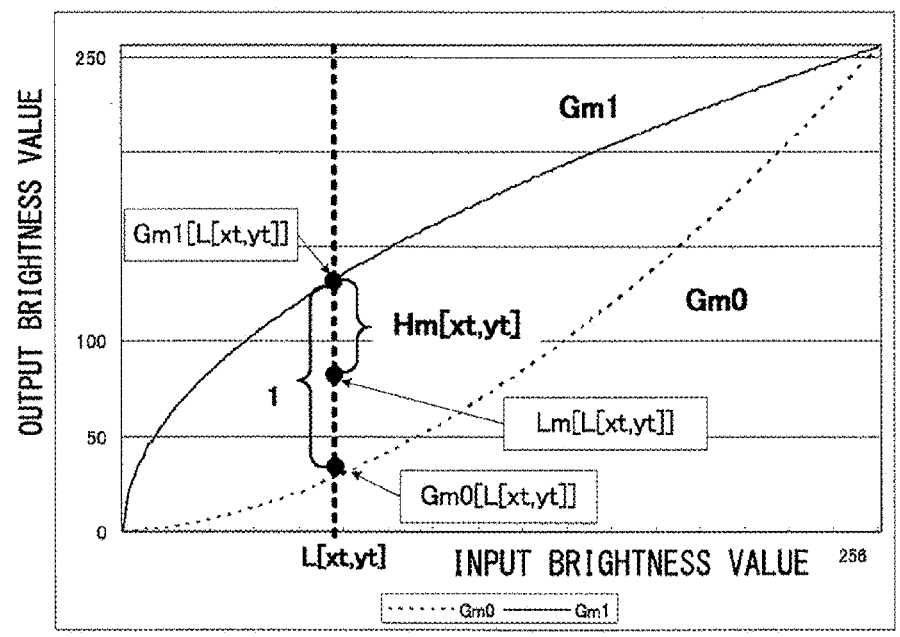
FIG. 11B illustrates a schematic diagram that illustrates an example of an upper limit value and a lower limit value with respect to a brightness value of a target pixel, and a converted brightness value in the middle brightness area.
Figure 11C:
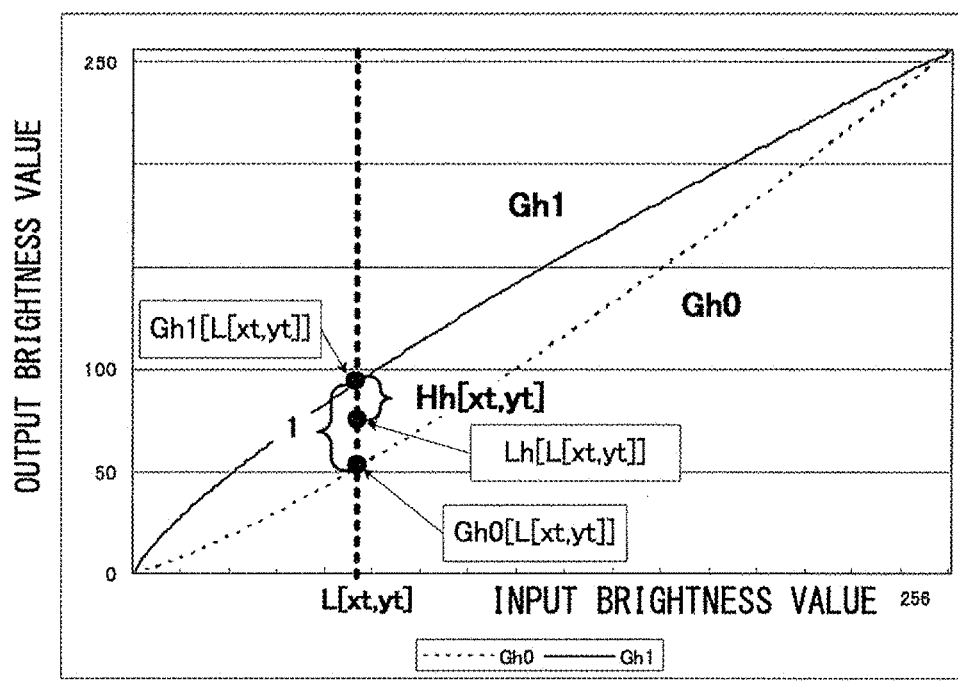
FIG. 11C illustrates a schematic diagram that illustrates an example of an upper limit value and a lower limit value with respect to a brightness value of a target pixel, and a converted brightness value in the high brightness area.

FIG. 5 illustrates a flowchart that illustrates an operation example of the image processing device 1. FIG. 6 illustrates a diagram that illustrates an example of a weighting function for dividing brightness into brightness areas. FIG. 7 illustrates a diagram that illustrates an example of a brightness value conversion function for the weighting function. FIG. 8A illustrates a diagram that illustrates an example of an upper limit conversion function and a lower limit conversion function in a low brightness area. FIG. 8B illustrates a diagram that illustrates an example of an upper limit conversion function and a lower limit conversion function in a middle brightness area. FIG. 8C illustrates a diagram that illustrates an example of an upper limit conversion function and a lower limit conversion function in a high brightness area. FIG. 9 illustrates a schematic diagram that illustrates an example of an original image for which the image processing device 1 performs image processing. FIG. 10 illustrates a schematic diagram that illustrates an example of a local area around a given pixel for which brightness is converted in the original image. FIG. 11A illustrates a schematic diagram that illustrates an example of an upper limit value and a lower limit value with respect to a brightness value of a target pixel, and a converted brightness value in the low brightness area. FIG. 11B illustrates a schematic diagram that illustrates an example of an upper limit value and a lower limit value with respect to a brightness value of a target pixel, and a converted brightness value in the middle brightness area. FIG. 11C illustrates a schematic diagram that illustrates an example of an upper limit value and a lower limit value with respect to a brightness value of a target pixel, and a converted brightness value in the high brightness area.

First, as illustrated in FIG. 5, the image processing device 1 sets a brightness area function corresponding to each brightness area (step S1). More specifically, as illustrated in FIG. 6, the CPU unit 2 of the image processing device 1 sets brightness area functions Ws, Wm and Wh (examples of lightness area functions) which classify brightness areas (examples of lightness areas) based on a weight, into a low brightness area Bs, a middle brightness area Bm and a high brightness area Bh. The brightness area functions Ws, Wm and Wh define each brightness area based on a weight for brightness. The low brightness area Bs is an area in which a value indicating brightness ranges from 0 to 255 in accordance with the weight of the brightness area function Ws. The middle brightness area Bm is an area in which brightness ranges from 0 to 256 in accordance with the weight of the brightness area function Wm. The high brightness area Bh is an area in which brightness ranges from 0 to 256 in accordance with the weight of the brightness area function Wh.

The brightness area functions Ws, Wm and Wh which are functions of the brightness value L are set by, for example, equation 1.

[Equation 1]

The brightness area function Ws and the brightness area function Wh are Gaussian functions, and a variance value σ is adjusted such that areas of the low, middle and high areas (sum of weights) are substantially equal. Further, the brightness area function Wm is set such that the sum of weights of brightness areas of a given brightness value is 1. In addition, although Gaussian functions are used with the present embodiment, other functions such as sigmoid curves may be used. Meanwhile, preferably, functions are functions which continuously change. Further, the number of areas to be divided is by no means limited to 3, and may be 2 or 4.

Thus, the image processing device 1 functions as an example of a lightness area function setting means that sets a lightness area function (such as the brightness area function Ws) for defining a lightness area (such as the low brightness area Bs) based on a weight for lightness. Further, the image processing device 1 functions as an example of a lightness area function setting means that sets each lightness area function per lightness area (each of the brightness areas Bs, Bm and Bh).

Next, the image processing device 1 sets a brightness value conversion function per brightness area from a brightness area function (step S2). More specifically, the CPU unit 2 of the image processing device 1 finds brightness cumulative functions Fs, Fm and Fh by accumulating the brightness area functions Ws, Wm and Wh. The brightness cumulative functions Fs, Fm and Fh are

[Equation 2]

where the minimum brightness is 0, and the maximum brightness is Lmax.

Further, as illustrated in FIG. 7, the CPU unit 2 of the image processing device 1 sets the brightness value conversion functions Cs, Cm and Ch (examples of lightness conversion functions) by the brightness cumulative functions Fs, Fm and Fh.

[Equation 3]

Meanwhile, the brightness value conversion functions Cs, Cm and Ch are functions obtained by dividing the brightness cumulative functions Fs, Fm and Fh by maximum values max[Fs], max[Fm] and max[Fh] which are maximum values in the brightness cumulative functions Fs. Fm and Fh in order to perform normalization.

Thus, the image processing device 1 functions as an example of a lightness conversion function setting means that finds the brightness cumulative functions Fs, Fm and Fh by accumulating lightness area functions (brightness area functions Ws, Wm and Wh) for lightness (brightness), and sets lightness conversion functions (brightness value conversion functions Cs, Cm and Ch). Further, the image processing device 1 functions as an example of a lightness conversion function setting means that sets each lightness conversion function (brightness value conversion functions Cs, Cm and Ch) for each lightness area function.

Next, the image processing device 1 sets upper and lower limit conversion functions per brightness area (step S3). More specifically, as illustrated in FIGS. 8A, 8B and 8C, the CPU unit 2 of the image processing device 1 sets upper limit gamma curve functions Gs1, Gm1 and Gh1 as upper limit conversion functions and lower limit gamma curve functions Gs0, Gm0 and Gh0 per brightness area Bs, Bm and Bh to define an upper limit value and a lower limit value of brightness conversion. Meanwhile, a gamma value of each gamma curve function (gamma correction function) can be arbitrarily set.

In addition, the upper limit conversion functions (upper limit gamma curve functions Gs1, Gm1 and Gh1) continuously and monotonically increase with respect to brightness, and define an upper limit of an output of brightness conversion. The lower limit conversion functions (lower limit gamma curve functions Gs0, Gm0 and Gh0) continuously and monotonically increase with respect to brightness, and define a lower limit of an output of brightness conversion. Further, the upper limit gamma curve functions Gs1, Gm1 and Gh1 and the lower limit gamma curve functions Gs0, Gm0 and Gh0 are gamma correction functions. Furthermore, the gamma correction function is an example of a function of making correction to match virtual characteristics with respect to lightness. Still further, although gamma curve functions have been described as examples of upper limit conversion functions and lower limit conversion functions with the present embodiment, curves for generating an upper limit conversion function and a lower limit conversion function are by no means limited to gamma curve functions as long as these curves monotonically increase. For example, the curves may be curves obtained by synthesizing a plurality of gamma curve functions or curves obtained by synthesizing a line and a gamma curve function.

Next, the image processing device 1 receives an input of an original image for which image processing is performed (step S4). More specifically, the CPU unit 2 of the image processing device 1 acquires an original image 30 as illustrated in FIG. 9 for which image processing is performed, from an outside of the image processing device 1, and stores the original image 30 in the frame memory of the memory unit 4. Meanwhile, as illustrated in FIG. 9, "black shadow" which is dark due to, for example, backlight and is hard to see or "blow-out highlight" which looks bright and is hard to see is produced in the original image, and the original image is an example where bias of brightness is produced.

Thus, the image processing device 1 functions as an example of an original image inputting means that receives an input of an original image for which image processing is performed.

Next, the image processing device 1 sets a processing target pixel in the original image (step S5). More specifically, the CPU unit 2 gives an image processing command to the image processing unit 3, and, as illustrated in FIG. 10, the image processing unit 3 sets a processing target pixel PIX [xt, yt] in the original image 30 in the memory unit 4. Still more specifically, when scan of the original image which is an image processing target comes to an end in the X direction, the image processing unit 3 moves the scan one pixel sequentially in the Y direction, sets a target pixel and sequentially performs digital processing of the original image per pixel.

Next, the image processing device 1 sets a local area around a target pixel (step S6). More specifically, as illustrated in FIG. 10, the image processing unit 3 of the image processing device 1 sets a local area 32 around a given target pixel PIX [xt, yt] which is a pixel for which lightness is converted. Meanwhile, when the Box-Filtering scheme is utilized, a local area is determined by setting the number of taps. The image processing device 1 scans the target pixel PIX [xt, yt] one by one in the X direction. Further, when scan comes to a right end of the original image in FIG. 10, the image processing device 1 returns the scan to a left end, moves one pixel in the Y direction and operates the scan in the X direction.

Thus, the image processing device 1 functions as an example of a local area setting means that sets a local area around a pixel for which lightness is converted, in an original image.

Next, the image processing device 1 calculates upper limit and lower limit conversion function values of a brightness value of a target pixel for each brightness area (step S7). More specifically, in a case of the low brightness area Bs, the CPU unit 2 of the image processing device 1 calculates an upper limit conversion function value Gs1 [L[xt, yt]] and a lower limit conversion function value Gs0 [L[xt, yt]] of the brightness value L [xt, yt] of the target pixel PIX [xt, yt] as illustrated in FIG. 11A. In a case of the middle brightness area Bin, the CPU unit 2 of the image processing device 1 calculates an upper limit conversion function value Gm1 [L[xt, yt]] and a lower limit conversion function value Gm0 ([L[xt, yt]] of the brightness value L [xt, yt] of the target pixel [xt, yt] as illustrated in FIG. 11B. In a case of the high brightness area Bh, the CPU unit 2 of the image processing device 1 calculates an upper limit conversion function value Gh1 [L[xt, yt]] and a lower limit conversion function value Gh0 [L[xt, yt]] of the brightness value L [xt, yt] of the target pixel [xt, yt] as illustrated in FIG. 11C.

In addition, the upper limit conversion function values Gs1 [L[xt, yt]], Gm1 [L[xt, yt]] and Gh1 [L[xt, yt]] are upper limit values which are values of the upper limit conversion functions Gs1, Gm1 and Gh1 of lightness (brightness value L [xt, yt]) of a pixel (target pixel PIX [xt, yt]) to be converted in each brightness area. The lower limit conversion function values Gs0 [L[xt, yt]], Gm0 [L[xt, yt]] and Gh0 [L[xt, yt]] are lower limit values which are values of the lower limit conversion functions Gs0, Gm0 and Gh0 of lightness (brightness value L [xt, yt]) of a pixel (target pixel PIX [xt, yt]) to be converted in each brightness area.

Thus, the image processing device 1 functions as an example of an upper limit conversion function setting means that sets an upper limit conversion function which continuously and monotonically increases with respect to lightness and determines an output upper limit of lightness conversion, and a lower limit conversion function setting means which continuously and monotonically increases with respect to lightness and determines an output lower limit of lightness conversion. Further, the image processing device 1 functions as an example of an upper limit conversion function setting means that sets an upper limit conversion function (upper limit gamma curve functions Gs1, Gm1 and Gh1) to each lightness area (brightness areas Bs, Bm, and Bh). Furthermore, the image processing device 1 functions as an example of a lower limit conversion function setting means that sets a lower limit conversion function (lower limit gamma curve functions Gs0, Gm0 and Gh0) to each lightness area (brightness areas Bs, Bm and Bh).

Still further, the image processing device 1 functions as an example of an upper limit/lower limit value calculating means that calculates an upper limit value which is a value of an upper limit conversion function of lightness of a pixel to be converted, and a lower limit value which is a value of a lower limit conversion function. Moreover, the image processing device 1 functions as an example of an upper limit/lower limit value calculating means that calculates each upper limit value according to the upper limit conversion function and lower limit value according to the lower limit conversion function corresponding to each lightness area (brightness areas Bs, Bm and Bh).

Next, the image processing device 1 finds a sum by applying a brightness value conversion function to each pixel in a local area, and calculates a division ratio for setting a value between upper limit and lower limit conversion function values (step S8). More specifically, the image processing unit 3 of the image processing device 1 finds data SumCs, SumCm and SumCh which are sums of brightness values converted by brightness value conversion functions Cs[L], Cm[L] and Ch[L] in the brightness areas Bs, Bm and Bh as statistical information of the local area 32 around the brightness value L [xt, yt] of the target pixel PIX [xt, yt] which is the coordinate [xt, yt]. Still more specifically, as illustrated in FIG. 2, the brightness value conversion table units TCs, TCm and TCh of the image processing unit 3 find the brightness value conversion functions Cs[L], Cm[L] and Ch[L] of each area for each pixel in the local area. Further, the Y direction addition processing units 10 and the X direction addition processing units 20 of the image processing unit 3 find the sum data SumCs, SumCm and SumCh. Furthermore, to receive from the image processing unit 3 and normalize data of the sum data SumCs, SumCm and SumCh, the CPU unit 2 of the image processing device 1 finds division ratios Hs, Hm and Hh by dividing the sum data SumCs, SumCm and SumCh by the number of pixels SUM included in a local area.

The division ratios Hs, Hm and Hh are represented by equation 4.
[Equation 4]

Meanwhile, a local area is a square with one side having a size of 2N+1. Further, brightness of each pixel included in the local area is L [i, j]. Furthermore, Cs [L[i, j]], Cm [L[i, j]] and Ch [L[i, j]] are simply referred to as Cs [i, j], Cm [i, j] and Ch [i, j].

In addition, the division ratios Hs, Hm and Hh are calculated at a high speed according to a Box-Filtering scheme (described below) by the Y direction addition processing units 10 and the X direction addition processing units 20. Further, although a local area has a square shape with the present embodiment, a local area may have a rectangular shape having an arbitrary aspect ratio. Furthermore, each coordinate value [i, j] increases in order of raster scan.

Next, the image processing device 1 finds a converted brightness value of each brightness area based on the upper limit and lower limit conversion function values and the division ratio (step S9). More specifically, the CPU unit 2 of the image processing device 1 finds the converted brightness values Ls, Lm and Lh per brightness area according to equation 5 utilizing the division ratios Hs, Hm and Hh, from the upper limit gamma value and the lower limit gamma value of each area corresponding to the brightness value L [xt, yt] of the target pixel PIX [xt, yt] per brightness area Bs, Bm and Bh.
[Equation 5]

As illustrated in FIG. 11A, in a case of the low brightness area Bs, the converted brightness value Ls [xt, yt] is found according to equation 5 utilizing the division ratio Hs [xt, yt], from the lower limit gamma Gs0 [L[xt, yt]] and the upper limit gamma value Gs1. [L[xt, yt]] of each area corresponding to the brightness value L [xt, yt].

Further, as illustrated in FIG. 11B, in case of the middle brightness area Bm, the converted brightness value Lm [xt, yt] is found according to equation 5 utilizing the division ratio Hm [xt, yt], from the lower limit gamma Gm0 [L[xt, yt]] and the upper limit gamma value Gm1 [L[xt, yt]] of each area corresponding to the brightness value L [xt, yt].

Furthermore, as illustrated in FIG. 11C, in case of the middle brightness area Bh, the converted brightness value Lh [xt, yt] is found according to equation 5 utilizing the division ratio Hh [xt, yt], from the lower limit gamma Gh0 [L[xt, yt]] and the upper limit gamma value Gh1 [L[xt, yt]] of each area corresponding to the brightness value L [xt, yt].

Thus, the image processing device 1 functions as an example of a ratio calculating means that calculates a ratio (division ratio H) for setting a value between an upper limit value and a lower limit value according to lightness (brightness) of each pixel in a local area. Further, the image processing device 1 functions as an example of a ratio calculating means that calculates a ratio by applying a lightness conversion function (brightness value conversion functions Cs, Cm and Ch) to lightness of each pixel in the local area. Furthermore, the image processing device 1 functions as an example of a ratio calculating means that calculates each ratio (division ratios Hs, Hm and Hh) for each upper limit value and lower limit value by applying each lightness conversion function (brightness value conversion functions Cs, Cm and Ch).

Next, the image processing device 1 finds converted brightness based on a converted brightness value of each brightness area (step S10). More specifically, the CPU unit 2 of the image processing device 1 adds the converted brightness values Ls [xt, yt], Lm [xt, yt] and Lh [xt, yt] of each area as in equation 6, and finds a brightness Lout [xt, yt] by converting a brightness value of the target pixel PIX [xt, yt].
[Equation 6]

Thus, the image processing device 1 functions as an example of a lightness calculating means that calculates converted lightness (brightness Lout) of a pixel for which lightness (brightness) is converted, based on the upper limit value, the lower limit value and the ratio. Further, the image processing device 1 functions as an example of a lightness calculating means that calculates converted lightness based on each upper limit value and lower limit value, and each ratio (division ratios Hs, Hm and Hh).

Next, the image processing device 1 decides whether or a pixel is the last one (step S11). More specifically, the image processing unit 3 scans the original image, and determines whether or not the scan comes to the last pixel. When the pixel is not the last one (step S11; NO), the image processing unit 3 returns to step S5, and moves to the next target pixel and converts brightness. When the pixel is the last one (step S11; YES), the image processing unit 3 finishes processing, and transmits an image processing end signal to the CPU unit 2.

(2.2 Description of Box-Filtering Scheme)

Next, the Box-Filtering scheme for processing an image at a high speed in the image processing unit 3 will be described using drawings.

Figure 12:
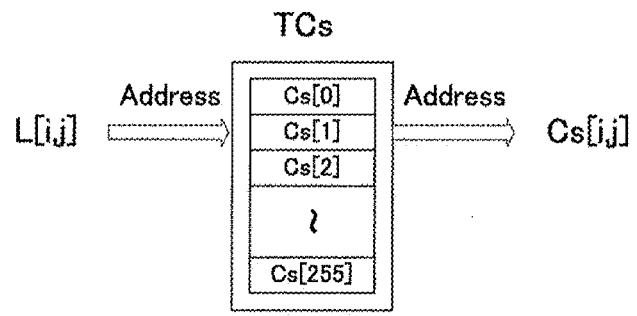
FIG. 12 illustrates a schematic diagram that illustrates an example of a brightness value conversion table.

FIG. 12 is a schematic diagram that illustrates an example of a brightness value conversion table. FIGS. 13 to 17 illustrate schematic diagrams that illustrate a concept of a Box filter.

Determining brightness of the target pixel PIX requires computation of all pixels included in the local area 32, and simply performing processing requires a great number of computations. As one of methods of reducing the number of computations, the concept of Box-Filtering can be appropriated.

Finding the division ratios Hs, Hm and Hh for the target pixel PIX [xt, yt] becomes heavy processing for circuit conversion. Although the division ratios Hs, Hm and Hh can be found according to the same method, the low brightness area Bs will be described using the division ratio Hs as an example.

First, as illustrated in FIG. 12, the brightness value conversion table unit TCs prepared in advance realizes the brightness value conversion function Cs. The brightness value conversion table unit TCs is implemented by, for example, a memory (RAM or ROM). Further, a value of Cs [L] is stored per address in data of the memory to receive an input of an arbitrary brightness value L as an address of the memory and output Cs [L] based on a conversion result for each brightness. For example, as illustrated in FIG. 12, a brightness range is 0 to 255, and the brightness value conversion table unit TCs of the image processing unit 3 receives an input of a brightness value L [i, j] of an arbitrary pixel PIX [i, j] and outputs Cs [i, j] as data of converted brightness.

Figure 13:
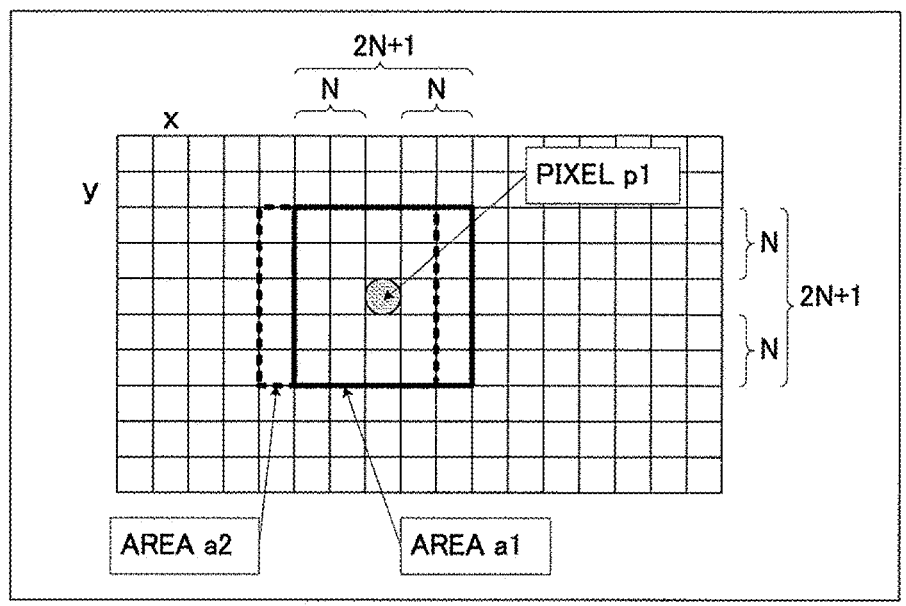
FIG. 13 illustrates a schematic diagram that illustrates a concept of a Box filter.

Next, a relationship between image data and a local area will be described using FIG. 13. In addition, for ease of description, a value of each pixel illustrated in FIG. 13 is data Cs [i, j] of brightness value conversion. The coordinate of a pixel p1 corresponds to the coordinate of the target pixel PIX [xt, yt]. The local area for the pixel p1 is an area a1. Further, the size of the area a1 is 2N+1×2N+1. Meanwhile, calculation of Hs[xt, yt] will be studied. Hs[xt, yt] is a value obtained by dividing SumCs[i, j] which is the sum of all Cs[i,j] included in a local area by the number of pixels SUM, so that it is possible to easily find Hs[xt, yt] by finding SumCs[i, j]. Hence, a method of finding the sum of all Cs[i, j] included in the local area will be described.

Figure 14:
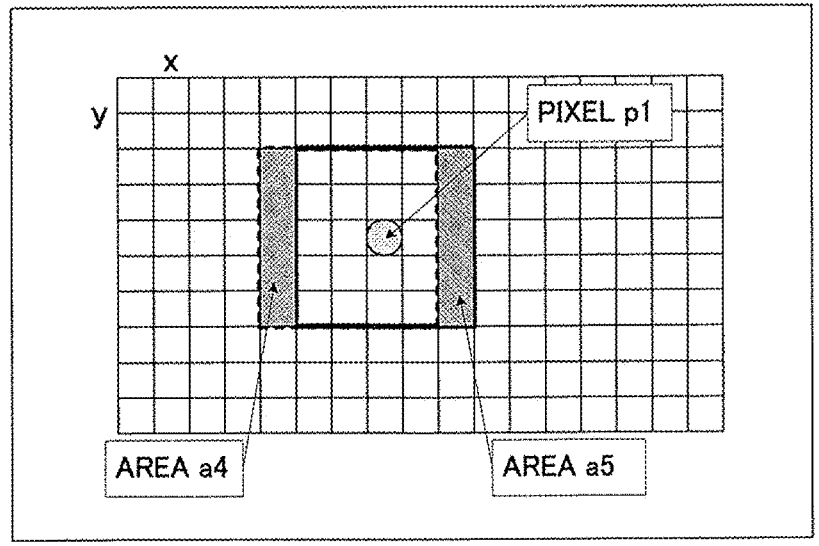
FIG. 14 illustrates a schematic diagram that illustrates the concept of the Box filter.

First, an area a2 will be studies as a local area for data Cs[xt−1, yt] of a pixel one pixel before the pixel p1 which is a target pixel in the X direction. The sum of Cs included in the area a2 is assumed to be already found. There is a common area between the areas a1 and the area a2. The difference is an area a4 and an area 5 as illustrated in FIG. 14. When the sum of Cs[i, j] in an area to be found is data SumCs[i, j], and the sum of Cs[i, j] in the area a4 or the area a5 is data BarCs[i, j] (meanwhile, i and j are coordinates in the center portion), area 1=area a2−area a4+area a5 holds, and the below equation is established.

[Equation 7]

Figure 15:
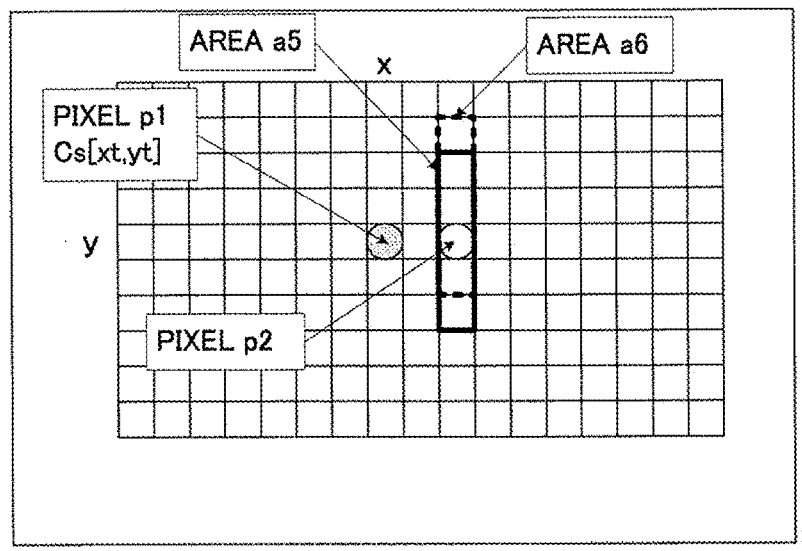
FIG. 15 illustrates a schematic diagram that illustrates the concept of the Box filter.
Figure 16:
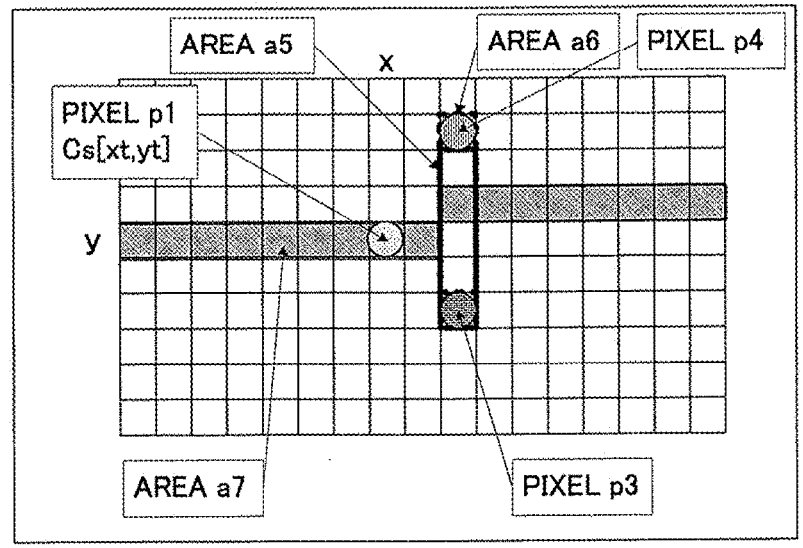
FIG. 16 illustrates a schematic diagram that illustrates the concept of the Box filter.

Next, a method of generating BarCs[xt+N, yt] in the area a5 will be described. A value of BarCs[xt+N, yt] in the center pixel is a value Cs[xt+N, yt] in the pixel P2. Upon generation, as illustrated in FIG. 15, an area a6 one pixel above (−1 in the Y direction) the area a5 in the Y direction, that is, BarCs[xt+N, yt−1], will be studied. There is also a common portion between the area a5 and the area a6, and, as illustrated in FIG. 16, area a5=area a6−pixel p4+pixel p3 holds based on a pixel p3 (Cs[xt+N, yt+N]) and a pixel p4 (Cs[xt+N, yt−N−1]) which area uncommon portions, and the below equation is established.

[Equation 8]

Meanwhile, a memory element MemCs (line memory 13) which stores one line of BarCs[i, j] will be studied. An area of the memory element MemCs is an area a7 illustrated in FIG. 16. That is, the below equation is established.

[Equation 9]

To find BarCs[x+N, yt], BarCs[xt+N, yt−1] refers to the memory element MemCs. By contrast with this, after BarCs[xt+N, yt] is generated, the memory element MemCs erases BarCs[xt+N, yt−1], and adds generated BarCs[xt+N, yt]. This operation makes it possible to support Cs[xt+1, yt] which is the next target pixel.

In view of above, it is only necessary to refer to only a pixel p4 and a pixel p3 to find the data SumCs[xt, yt], so that it is possible to find SumCx[xt, yt] with a small number of computations. Further, with this scheme, computation cost is the same irrespectively of the size of a local area. Meanwhile, it is necessary to prepare MemCs of the first one line before image processing to apply this scheme. Further, there is no data SumCs on a left side of an image, and therefore simple addition is required.

Figure 17:
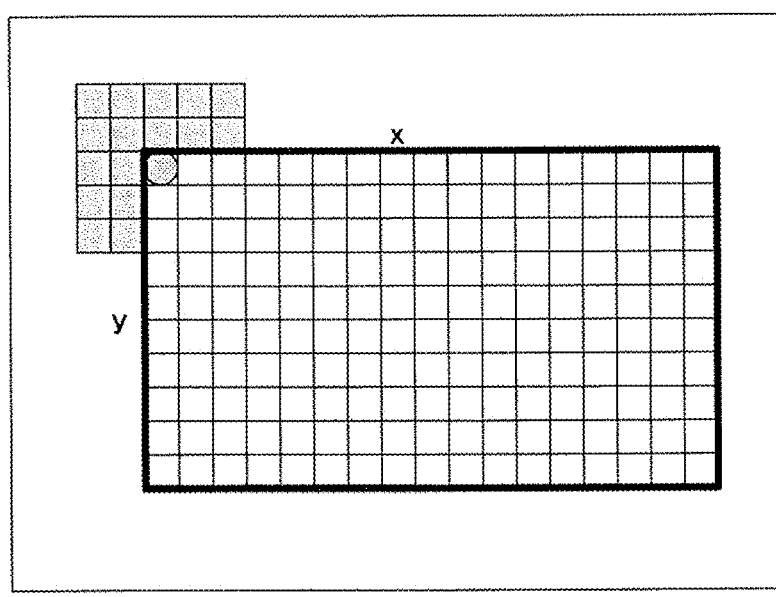
FIG. 17 illustrates a schematic diagram that illustrates the concept of the Box filter.

In addition, as illustrated in FIG. 17, pixels near each side of an image assume virtual pixels around target pixels. For a method of assuming a virtual pixel, various schemes such as a mirror scheme are proposed. In a case of the mirror scheme, although, for example, Cs[−2, −2] is required to generate Cs[0, 0], Cs[2,−2] only needs to be substituted for this pixel.

(2.3 Circuit Convention According to Box-Filtering Scheme)

Next, as to a method of converting the method described in (2.2) into a circuit, process of generating data SumCs[xt, yt] will be described using the block diagrams of FIGS. 2 to 4.

In addition, the memory unit 4 stores gamma tables TGS1, TGs0T, Gm1, TGm0, TGh1 and TGh0 resulting from upper and lower limit gamma curve functions Gs1, Gs0, Gm1, Gm0, Gh1 and Gh0, and adopts a structure which can be referred to by the image processing unit 3 whenever necessary.

The data SumCs[xt, yt] for the target pixel PIX[xt, yt] is generated by processing according to above equation 7 and equation 8 from data Cs[xt+N, yt−N−1] and data Cs[xt+N, yt+N] obtained by converting input data L[xt+N, yt−N−1] and L[xt+N, yt+N] of a brightness value in FIG. 2 by the brightness value conversion table unit TCs.

As illustrated in FIG. 2, the Y direction addition processing unit 10 corresponds to equation 8, and generates data BarCs. The X direction addition processing unit 20 corresponds to equation 7, and generates data SumCs.

As illustrated in FIG. 3, with the Y direction addition processing unit 10, data BarCs[xt+N, yt−1] of equation 8 is referred from the line memory 13 (MemCs). The line memory 13 (MemCs) is a memory which stores one line of data BarCs, and functions as an FIFO memory which discards BarCs[xt+N, yt−1] which is referred to every addition processing, and stores generated BarCs[xt+N, yt].

Next, as illustrated in FIG. 4, with the X direction addition processing unit 20, data BarCs[xt+N, yt] is an output of the Y direction addition processing unit 10. Data BarCs[xt−N−1, yt] is a value 2N+1 before the input data BarCs[xt+N, yt]. Hence, the data BarCs[xt−N−1, yt] is generated by delaying an input by the shift register 23. When the subtractor 22 subtracts an output of the shift register 23 from an output of the adder 21, data SumCs[xt, yt] is generated. In addition, although BarCs[xt−N−1, yt] is generated by delay caused by the shift register 23 in FIG. 4, the same value is also stored in the line memory 13 (MemCs) and therefore can be used.

In addition, the same applies to process of generating data SumCm[xt, yt] in the middle brightness area Bin and data SumCh[xt, yt] in the high brightness area Bh, and description thereof will be omitted. Although process of generating data Lout from data SumCs, SumCm and SumCh may be performed by a circuit or a CPU, circuit conversion is desirable to increase an image processing speed.

(2.4 Image Processing Result)

Next, an image processing result will be described using FIGS. 18 and 19.

Figure 18:
FIG. 18 illustrates a schematic diagram that illustrates an example of an image with converted brightness by the image processing device in FIG. 1.
Figure 19:
FIG. 19 illustrates a schematic diagram that illustrates an example of an image with converted brightness.

FIG. 18 illustrates a schematic diagram that illustrates an example of an image with converted brightness according to the present embodiment. FIG. 19 illustrates a schematic diagram that illustrates an example of an image with converted brightness according to a method of Patent Document 2.

As illustrated in FIG. 18, the image processing device 1 performs image processing of the original image 30, and acquires an image 40 in which "black shadow" portion (field) is defined. Further, as illustrated in FIG. 19. in an image 41 showing an image processing result according to the method of Patent Document 2, a shading portion such as a striped pattern is produced in a gradation area showing the sky. However, as illustrated in FIG. 18, the gradation area such as the sky can be reproduced in the image processing result by the method according to the present embodiment.

As described above, the image processing device 1 sets the local area 32 around a pixel for which brightness is converted, in the original image 30, sets an upper limit conversion function (such as Gs1) which continuously and monotonically increases with respect to brightness and determines an output upper limit of brightness conversion, and sets a lower limit conversion function (such as Gs0) which continuously and monotonically increases with respect to brightness and determines an output lower limit of brightness conversion. Further, the image processing device 1 calculates an upper limit value (such the upper limit conversion function value Gs1[L[xt, yt]]) which is a value of the upper limit conversion function of brightness (L[xt, yt]) of a pixel to be converted and a lower limit value (such as the lower limit conversion function value Gs0 [L[xt, yt]]) which is a value of a lower limit conversion function, calculates, for example, the division ratio Hs for setting a value between the upper limit value and the lower limit value according to brightness of each pixel in the local area 32, and calculates converted brightness for which brightness is converted, based on the upper limit value, the lower limit value and the division ratio. Consequently, according to the present embodiment, it is possible to accurately convert brightness of each pixel even for an image having continuous lightness. That is, it is possible to convert brightness even for an image including a gradation area such as the sky.

According to brightness of each pixel in the local area 32, the division ratios Hs, Hm and Hh are calculated. Using, for example, average values in the local area 32 such as sum data SumCs, SumCm and SumCh for pixels included in the local area 32 of the target pixel PIX[xt, yt], the division ratios Hs, Hm and Hh are calculated. Hence, even if a target pixel is shifted by one pixel, values of the division ratios Hs, Hm and Hh do not significantly change, and a rate of conversion does not significantly change even for other target pixels near a target pixel. Consequently, it is possible to perform good brightness conversion even for an image including a gradation area such as the sky.

In addition, with a conventional method, in a case of an image in which brightness moderately changes such as an image including the gradation area such as the sky, when brightness is converted with a shape in which a brightness histogram concentrates on specific brightness, the histogram shape widens and therefore good brightness conversion cannot be performed. However, according to the present embodiment, it is possible to prevent extreme brightness conversion using the upper limit conversion function (such as Gs1) and the lower limit conversion function (such as Gs0), and perform good brightness conversion even for an image including the gradation area such as the sky.

Further, according to the present embodiment, it is possible to highly accurately improve contrast without block noise. Furthermore, the image processing device 1 can adequately convert lightness of each pixel at a high speed.

Still further, the image processing device 1 sets a lightness area function (such as the brightness area function Ws) for defining a lightness area (such as the low brightness area Bs) based on a weight for lightness (brightness), sets a lightness conversion function (such as the brightness value conversion function Cs) by accumulating the lightness area function for lightness (such as the brightness cumulative function Fs), applies the lightness conversion function to lightness of each pixel in a local area and calculates, for example, the division ratio Hs, so that it is possible to determine a division ratio which reflects information of each pixel in the local area, and improve the accuracy of lightness conversion.

Moreover, the image processing device 1 sets each lightness area function (brightness area functions Ws, Wm and Wh) per lightness area (brightness areas Bs, Bm and Bh), sets each lightness conversion function (brightness value conversion functions Cs, Cm and Ch) for each lightness area function, sets the upper limit conversion function (upper limit gamma curve functions Gs1, Gm1 and Gh1) according to each lightness area and sets the lower limit conversion function (lower limit gamma curve functions Gs0, Gm0 and Gh0) according to each lightness area. Further, the image processing device 1 calculates each upper limit value according to the upper limit conversion function and lower limit value according to the lower limit conversion function corresponding to each lightness area, calculates each upper limit value and lower limit value, applies each lightness conversion function, calculates each ratio (division ratios Hs, Hm and Hh) for each upper limit value and lower limit value, and calculates converted lightness based on each upper limit value and lower limit value and each ratio, so that a user can adjust, for example, the contrast by adjusting at least one of the brightness area functions Ws, Wm and Wh, the upper limit conversion function and the lower limit conversion function per brightness area.

Furthermore, when lightness area functions (brightness area functions Ws, Wm and Wh) are continuous functions, it is possible to improve accuracy of image processing particularly in an area having continuous lightness of an original image.

Still further, when the upper limit conversion function and the lower limit conversion function are functions such as gamma correction functions of making correction to match visual characteristics for lightness, it is possible to correct an image to match senses of people.

Next, a modified example of the present embodiment will be described using drawings.

Figure 20:
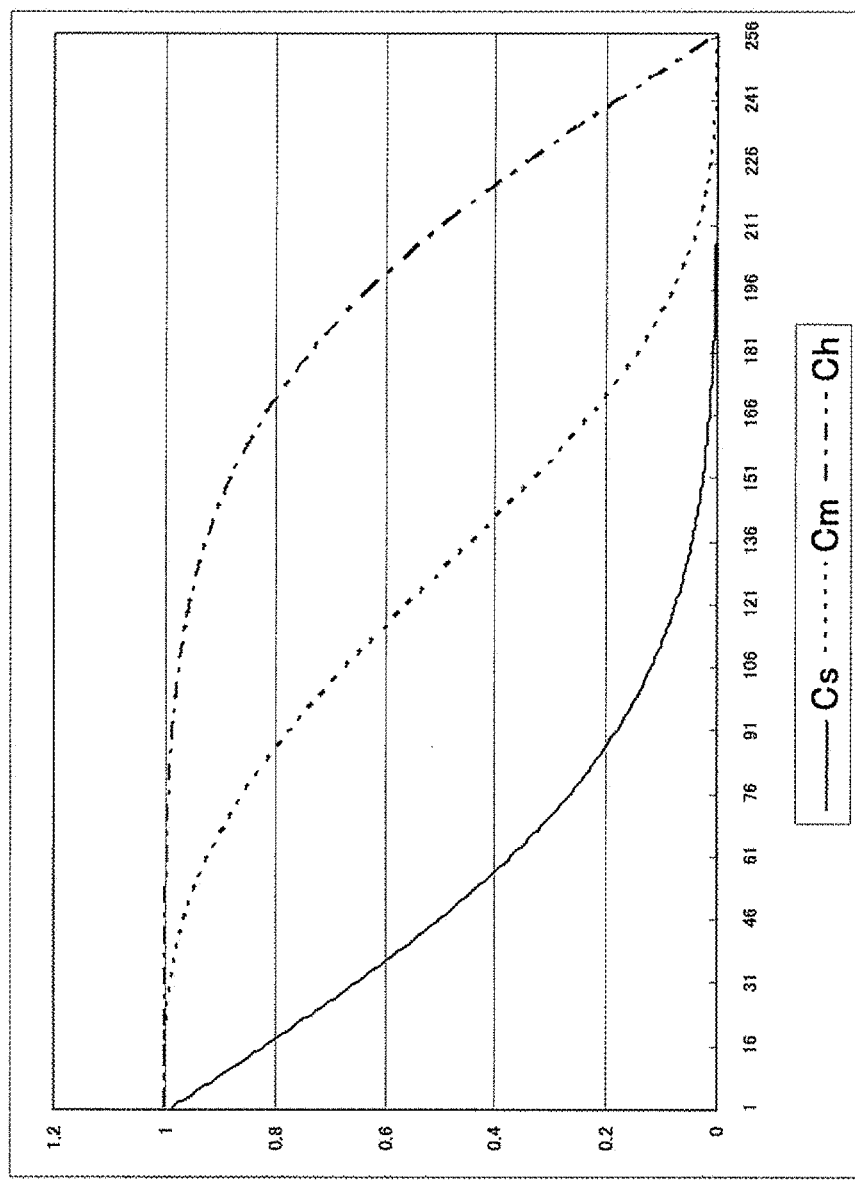
FIG. 20 illustrates a diagram that illustrates a modified example of a brightness conversion function for the weighting function in FIG. 6.
Figure 21:
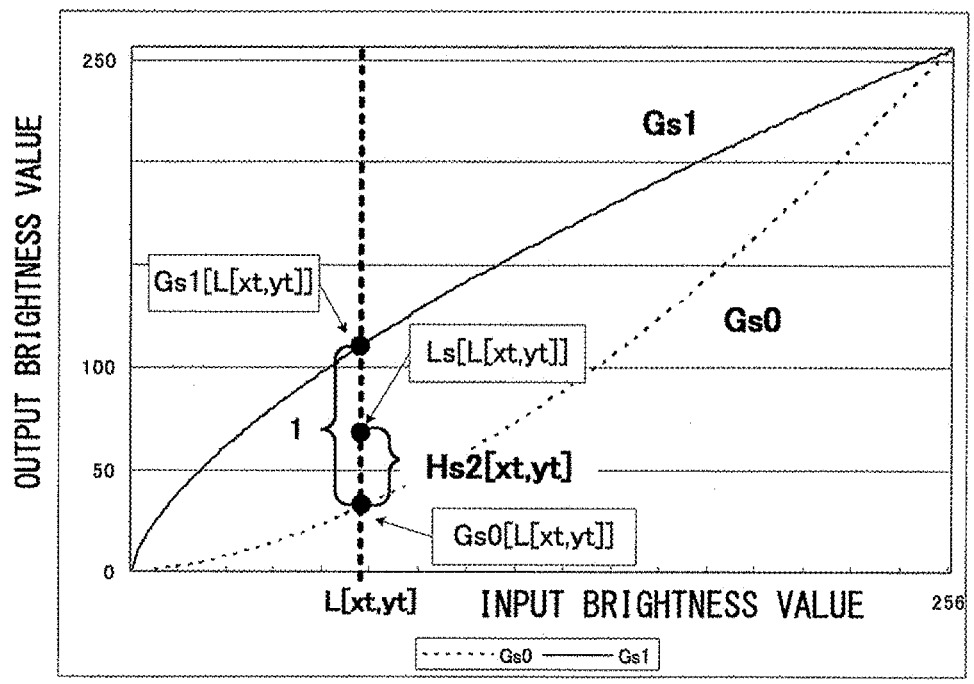
FIG. 21 illustrates a schematic diagram that illustrates a modified example of a ratio in FIG. 11A.

FIG. 20 illustrates a diagram that illustrates a modified example of a brightness conversion function for the weighting function. FIG. 21 illustrates a schematic diagram that illustrates a modified example of a ratio.

As illustrated in FIG. 20, the brightness value conversion functions Cs, Cm and Ch in FIG. 7 may be inverted in an axial direction of brightness.

For example, the brightness conversion function Cs may be Cs=1−Fs[L]/max[Fs] . . . (Equation 10).

As illustrated in FIG. 21, the division ratio Hs is a ratio from Gs0 upon comparison with FIG. 11A.

[3. Operation of Image Processing Device According to Second Embodiment]

Next, an operation according to a second embodiment of the present invention will be described.

With the operation according to the second embodiment, a schematic configuration of the image processing device is the same as in the first embodiment. In addition, the same or corresponding parts as in the first embodiment will be assigned the same reference numerals, and only different configurations and functions will be described. The same applies to other embodiments and modified examples.

Next, an operation example of the image processing device 1 according to the second embodiment will be described using FIGS. 22, 23A and 23B.

Figure 22:
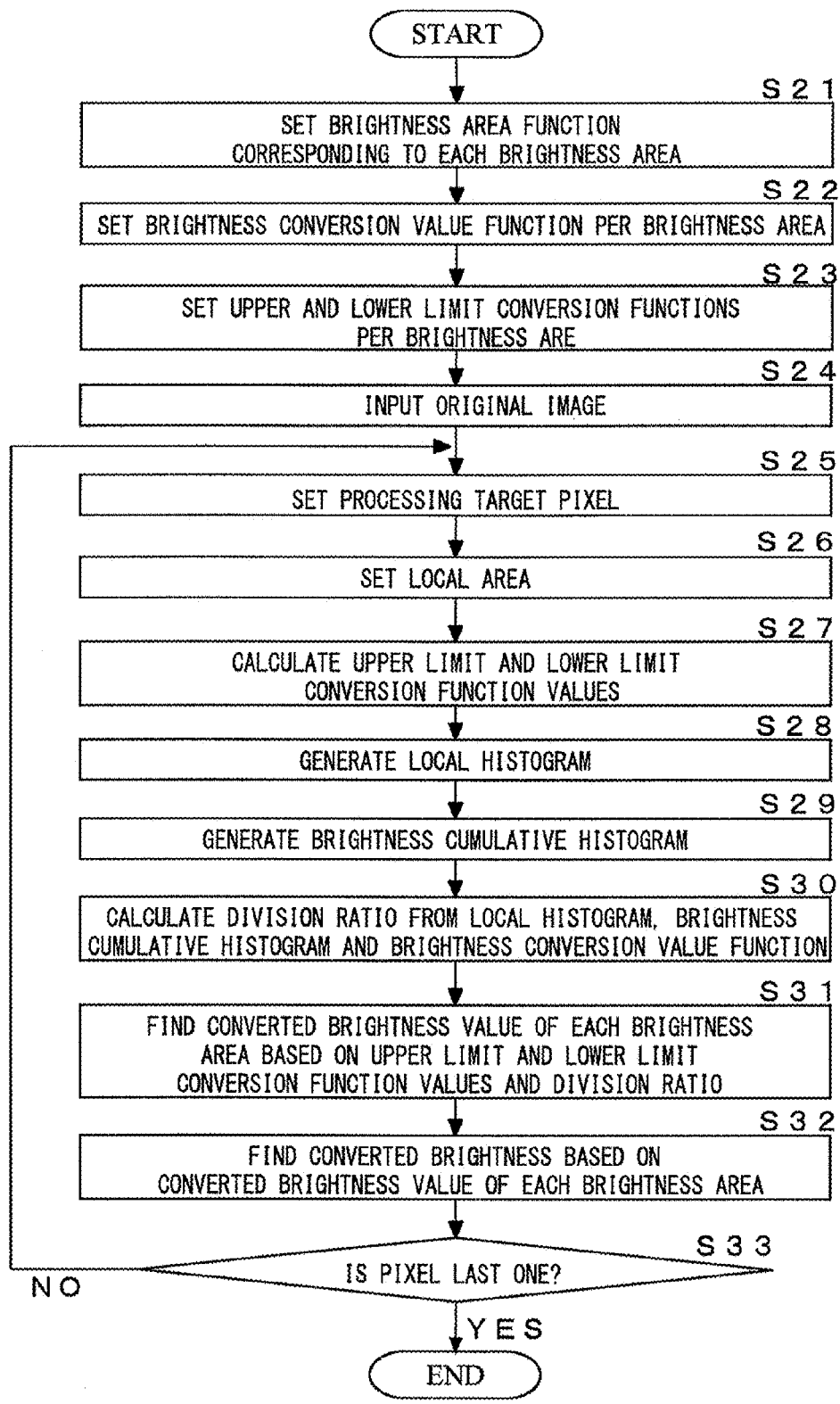
FIG. 22 illustrates a flowchart that illustrates an operation example of the image processing device in FIG. 1 according to a second embodiment of the present invention.
Figure 23A:
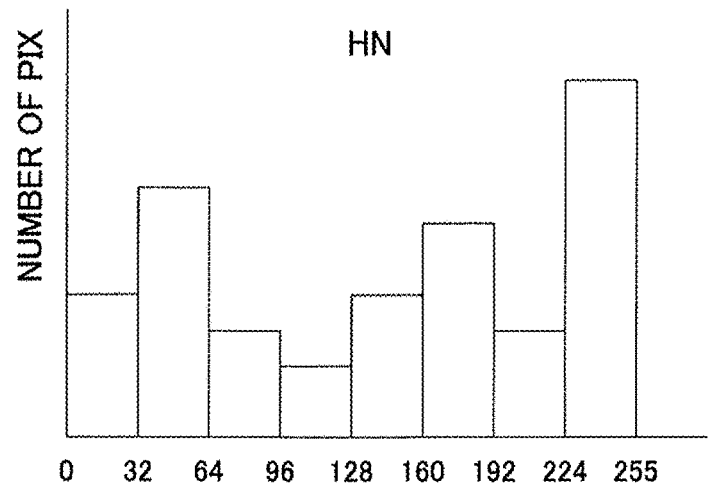
FIG. 23A illustrates a diagram that illustrates an example of a brightness cumulative histogram obtained by accumulating a brightness value of each pixel in a local area.
Figure 23B:
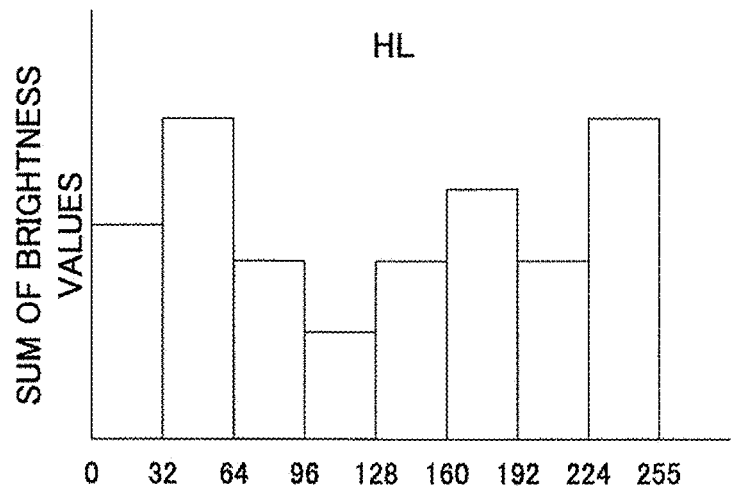
FIG. 23B illustrates a diagram that illustrates an example of a local histogram related to brightness in a local area.

FIG. 22 illustrates a flowchart that illustrates an operation example of the image processing device 1 according to the second embodiment of the present invention. FIG. 23A illustrates a diagram that illustrates an example of a brightness cumulative histogram obtained by accumulating a brightness value of each pixel in a local area. FIG. 23B illustrates a diagram that illustrates an example of a local histogram related to brightness in a local area.

First, as illustrated in FIG. 22, processings in steps S21 to S27 are the same as in steps S1 to S7 according to the first embodiment. Further, processings in steps S31 to S33 are the same as in steps S9 to S11 according to the first embodiment. Hence, processings in steps S28 to S30 will be described.

In step S27, after calculating the upper limit/lower limit conversion function values, the image processing device 1 generates a local histogram (step S28). More specifically, as illustrated in FIG. 23A, the CPU unit 2 or the image processing unit 3 of the image processing device 1 integrates the number of pixels in each bin based on a predetermined number of bins (for example, the number of bins is 8) for a brightness value of a pixel in the local area 32, and generates a histogram HN as in equation 11.

[Equation 11]

Meanwhile, a symbol which indicates each class is referred to as "bin". Further, only pixels included in a brightness range of individual target classes bin are targets.

Thus, the image processing device 1 functions as an example of a local histogram calculating means that calculates a local histogram related to lightness in a local area.

Next, the image processing device 1 generates a brightness cumulative histogram (step S29). More specifically, as illustrated in FIG. 23B, the CPU unit 2 or the image processing unit 3 of the image processing device 1 generates a brightness cumulative histogram HL obtained by integrating the brightness values L (equation 12).

[Equation 12]

For example, a class of the smallest brightness range has a class number 0 (bin=0), and includes three pixels in this class. When the brightness value of each pixel is "5, 12, 21", HN[0]=3 and HL[0]=5+12+21=38 hold.

Thus, the image processing device 1 functions as an example of a lightness cumulative histogram calculating means that calculates a lightness cumulative histogram obtained by accumulating lightness of each pixel in a local area.

Next, the image processing device 1 calculates a division ratio based on a local histogram, a brightness cumulative histogram and a brightness value conversion function (step S30). More specifically, the CPU unit 2 or the image processing unit 3 of the image processing device 1 first finds an average brightness Lavr per class from the histogram HN and the brightness cumulative histogram HL of each class (Equation 13).

[Equation 13]

Further, the CPU unit 2 or the image processing unit 3 of the image processing device 1 adds a value multiplied with the number of pixels included in each class, to values obtained by converting per class the average brightness Lavr by the brightness value conversion functions Cs, Cm and Ch in all classes, divides the values by the number of pixels included in the local area, and finds division ratios Hs', Hm' and Hh' (equation 14).

[Equation 14]

Meanwhile, a minimum value of bin is 0, and the maximum value is BINmax. Further, similarly, the division ratios Hm' and Hh' can also be found in the middle brightness area Bm and the high brightness area Bh. In addition, the division ratios Hs', Hm' and Hh' have approximate values of the division ratios Hs, Hm and Hh found in the first embodiment.

Thus, the image processing device 1 functions as an example of a ratio calculating means that calculates a ratio (division ratios Hs', Hm' and Hh') based on the local histogram and the lightness cumulative histogram.

Processings in steps S31 to S33 after the division ratios Hs', Hm' and Hh' are calculated are the same as in steps S9 to S11 in the first embodiment.

In addition, although a brightness value conversion function is converted and integrated per all pixels included in a local area with the first embodiment, an average value of pixels included in each class is used as a representative value with the present embodiment. Further, although an arithmetic average value is used as a representative value of brightness of each class with the present embodiment, for example, a median value or a mode value may be used as a representative value.

As described above, even by calculating a local histogram related to lightness in a local area, calculating a lightness cumulative histogram obtained by accumulating lightness of each pixel in the local area and calculating a ratio based on the local histogram and the lightness cumulative histogram, it is possible to accurately convert brightness of each pixel even for an image having continuous lightness.

In addition, the processings according to the first and second embodiments may be executed by a computer. In this case, for example, the computer reads a program of executing processing according to the first and second embodiments from, for example, a recording medium, and executes the program.

Further, the image correcting technique according to the first and second embodiments is applicable not only to image processing in digital still cameras and video cameras, but also to various uses in medical procedure, installation in cars and monitoring.

Furthermore, the present invention is by no means limited to the above embodiments. The above embodiments are exemplary embodiments, and all inventions employing substantially the same configuration as the technical idea recited in the claims of the present invention and providing the same function and effect are incorporated in the technical range of the present invention.

DESCRIPTION OF REFERENCE NUMERALS

1: IMAGE PROCESSING DEVICE
2: CPU UNIT
3: IMAGE PROCESSING UNIT
4: MEMORY UNIT
10: Y DIRECTION ADDITION PROCESSING UNIT
20: X DIRECTION ADDITION PROCESSING UNIT
30: ORIGINAL IMAGE
32: LOCAL AREA
L: BRIGHTNESS VALUE (LIGHTNESS)
Bs, Bm, Bh: BRIGHTNESS AREA (LIGHTNESS AREA)
Ws, Wm, Wh: BRIGHTNESS AREA FUNCTION (LIGHTNESS AREA FUNCTION)
Cs, Cm, Ch: BRIGHTNESS VALUE CONVERSION FUNCTION (LIGHTNESS CONVERSION FUNCTION)
Gs0, Gm0, Gh0: LOWER LIMIT GAMMA CURVE FUNCTION (LOWER LIMIT CONVERSION FUNCTION)
Gs1, Gm1, Gh1: UPPER LIMIT GAMMA CURVE FUNCTION (UPPER LIMIT CONVERSION FUNCTION)
Hs, Hm, Hh: DIVISION RATIO (RATIO)
Lout: BRIGHTNESS (CONVERTED LIGHTNESS)

The invention claimed is:

1. An image processing device comprising:
an original image inputting unit that receives an input of an original image for which image processing is performed;
a local area setting unit that sets a local area around a pixel for which lightness is converted, in the original image;
an upper limit conversion function setting unit that sets an upper limit conversion function which continuously and monotonically increases with respect to the lightness, and determines an output upper limit of lightness conversion;
a lower limit conversion function setting unit that sets a lower limit conversion function which continuously and monotonically increases with respect to the lightness, and determines an output lower limit of lightness conversion;
an upper limit/lower limit calculating unit that calculates an upper limit value which is a value of the upper limit conversion function of lightness of the pixel to be converted and a lower limit value which is a value of the lower limit conversion function;

a ratio calculating unit that calculates a ratio for setting a value between the upper limit value and the lower limit value according to lightness of each pixel in the local area; and a lightness calculating unit that calculates converted lightness of a pixel for which the lightness is converted, based on the upper limit value, the lower limit value and the ratio.

2. The image processing device according to claim 1, further comprising:

a lightness area function setting unit that sets a lightness area function for defining a lightness area according to a weight with respect to the lightness; and a lightness conversion function setting unit that sets a lightness conversion function by accumulating the lightness area function for lightness, wherein the ratio calculating unit calculates a ratio by applying the lightness conversion function to lightness of each pixel in the local area.

3. The image processing device according to claim 2, wherein the lightness area function setting unit sets each lightness area function per lightness area, the lightness conversion function setting unit sets each lightness conversion function for each lightness area function, the upper limit conversion function setting unit sets an upper limit conversion function according to each lightness area, the lower limit conversion function setting unit sets a lower limit conversion function according to each lightness area, the upper limit/lower limit calculating unit calculates each upper limit value according to the upper limit conversion function and lower limit value according to the lower limit conversion function corresponding to each lightness area, the ratio calculating unit calculates each ratio for the upper limit value and the lower limit value by applying each lightness conversion function, and the lightness calculating unit calculates the converted lightness based on each of the upper limit value and the lower limit value and each of the ratios.

4. The image processing device according to claim 1, wherein the lightness area function is a continuous function.

5. The image processing device according to claim 1, wherein the upper limit conversion function and the lower limit conversion function are functions for making correction to match visual characteristics with respect to lightness.

6. The image processing device according to claim 5, wherein the upper limit conversion function and the lower limit conversion function are gamma correction functions.

7. The image processing device according to claim 1, further comprising:

a local histogram calculating unit that calculates a local histogram related to lightness in the local area; and a lightness cumulative histogram calculating unit that calculates a lightness cumulative histogram obtained by accumulating lightness of each pixel in the local area, wherein the ratio calculating unit calculates the ratio based on the local histogram and the lightness cumulative histogram.

8. An image processing method of performing image processing in an image processing device, comprising:

an original image inputting step of receiving an input of an original image for which image processing is performed;

a local area setting step of setting a local area around a pixel for which lightness is converted, in the original image;

an upper limit conversion function setting step of setting an upper limit conversion function which continuously and monotonically increases with respect to the lightness, and determines an output upper limit of lightness conversion;

a lower limit conversion function setting step of setting a lower limit conversion function which continuously and monotonically increases with respect to the lightness, and determines an output lower limit of lightness conversion;

an upper limit/lower limit calculating step of calculating an upper limit value which is a value of the upper limit conversion function of lightness of the pixel to be converted and a lower limit value which is a value of the lower limit conversion function;

a ratio calculating step of calculating a ratio for setting a value between the upper limit value and the lower limit value according to lightness of each pixel in the local area; and a lightness calculating step of calculating converted lightness of a pixel for which the lightness is converted, based on the upper limit value, the lower limit value and the ratio.

9. A non-transitory computer-readable recording medium recording an image processing program causing a computer to function as:

an original image inputting unit that receives an input of an original image for which image processing is performed;

a local area setting unit that sets a local area around a pixel for which lightness is converted, in the original image;

an upper limit conversion function setting unit that sets an upper limit conversion function which continuously and monotonically increases with respect to the lightness, and determines an output upper limit of lightness conversion;

a lower limit conversion function setting unit that sets a lower limit conversion function which continuously and monotonically increases with respect to the lightness, and determines an output lower limit of lightness conversion;

an upper limit/lower limit calculating unit that calculates an upper limit value which is a value of the upper limit conversion function of lightness of the pixel to be converted and a lower limit value which is a value of the lower limit conversion function;

a ratio calculating unit that calculates a ratio for setting a value between the upper limit value and the lower limit value according to lightness of each pixel in the local area; and a lightness calculating unit that calculates converted lightness of a pixel for which the lightness is converted, based on the upper limit value, the lower limit value and the ratio.

* * * * *